United States Patent
Menon

(10) Patent No.: US 11,069,351 B1
(45) Date of Patent: Jul. 20, 2021

(54) VEHICLE VOICE USER INTERFACE

(71) Applicant: Amazon Technologies, Inc., Seattle, WA (US)

(72) Inventor: Prem Menon, San Ramon, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 115 days.

(21) Appl. No.: 16/216,441

(22) Filed: Dec. 11, 2018

(51) Int. Cl.
| | |
|---|---|
| *G10L 15/22* | (2006.01) |
| *G10L 15/18* | (2013.01) |
| *B60K 35/00* | (2006.01) |
| *G06F 3/16* | (2006.01) |

(52) U.S. Cl.
CPC .............. *G10L 15/22* (2013.01); *B60K 35/00* (2013.01); *G06F 3/167* (2013.01); *G10L 15/1815* (2013.01); *B60K 2370/148* (2019.05); *G10L 2015/223* (2013.01); *G10L 2015/228* (2013.01)

(58) Field of Classification Search
CPC ................. G10L 15/22; G10L 15/1815; G10L 2015/223; G10L 2015/228; B60K 2370/148; B60K 35/00; G06F 3/167
See application file for complete search history.

(56) References Cited

U.S. PATENT DOCUMENTS

| | | | | |
|---|---|---|---|---|
| 2008/0268947 A1* | 10/2008 | Fyock | ................... | A63F 13/352 463/29 |
| 2009/0112602 A1* | 4/2009 | Alfred | ..................... | G10L 15/26 704/273 |
| 2014/0200745 A1* | 7/2014 | Sekiguichi | ......... | G01C 21/3453 701/2 |
| 2017/0160813 A1* | 6/2017 | Divakaran | .......... | G10L 15/1815 |
| 2018/0286395 A1* | 10/2018 | Li | ........................... | G10L 17/06 |
| 2020/0051567 A1* | 2/2020 | Ramie | ................... | B60W 50/06 |

* cited by examiner

*Primary Examiner* — Sonia L Gay
(74) *Attorney, Agent, or Firm* — K&L Gates LLP

(57) ABSTRACT

Devices and techniques are generally described for implementing a vehicle voice user interface. In some examples, a first request may be received from a first computing system. In some further examples, natural language data comprising a semantic representation of the first request may be determined. In some further examples, first metadata corresponding to the first computing system may be determined. In some examples, a restriction on execution of the first action may be determined in accordance with the first metadata. In at least some further examples, output data indicative of the restriction on execution of the first action may be sent to the first computing system.

19 Claims, 10 Drawing Sheets

VEHICLE VOICE USER INTERFACE

BACKGROUND

Automatic speech recognition (ASR) combined with language processing techniques may enable a computing device to retrieve and process commands from a user based on the user's spoken commands. In some systems, speech recognition and/or voice-controlled devices activate upon detection of a spoken "wake-word". Natural language processing is used to translate the spoken requests into computer-executable instructions. The executable instructions are executed and a corresponding task is performed. Such speech recognition and voice control may be used by personal computers, hand-held devices, telephone computer systems, and a wide variety of other computing devices to improve human-computer interactions and to control various systems.

DETAILED DESCRIPTION

Figure 1:
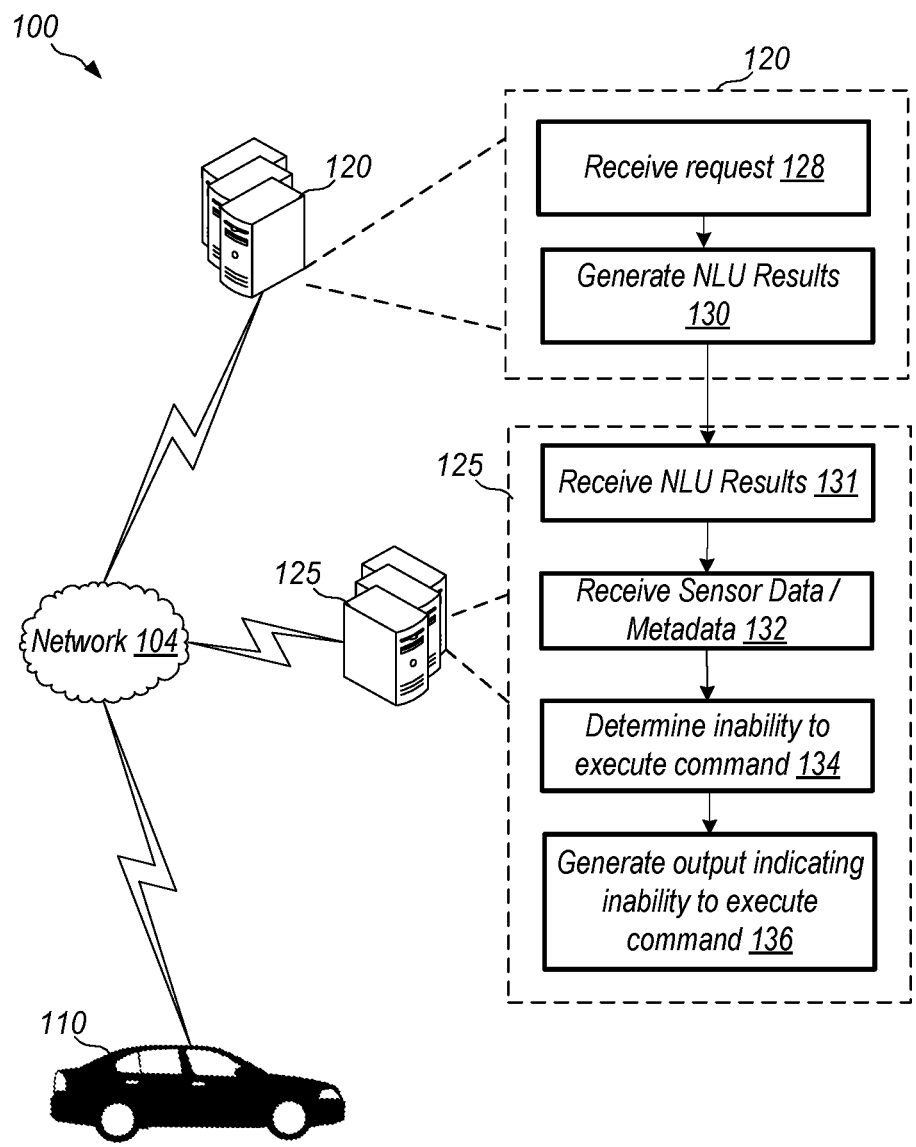
FIG. 1 is a conceptual illustration of a system configured to determine an inability to perform a requested action and to generate an output message related to the inability to perform the requested action, according to various embodiments of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language, resulting in specific executable commands or other type of instructions. Text-to-speech (TTS) is a field of computer science, artificial intelligence, and linguistics concerned with enabling computers to output synthesized speech. ASR, NLU, and TTS may be used together as part of a speech processing system.

Spoken language understanding (SLU) is a field of computer science, artificial intelligence, and/or linguistics that receives spoken language as an input, interprets the input, and generates executable commands that may be executed by one or more other computing devices and/or speech processing components. In various examples, spoken language understanding may be a combination of ASR systems and NLU systems, while in other examples, spoken language understanding may be a single model or other type of component effective to perform the functions of both ASR and NLU or otherwise take audio data as an input and output executable commands or other types of instructions representing the meaning of the audio data. In various further examples, SLU may include TTS where a machine learning model may receive input audio data (e.g., a user utterance) and may generate output audio data in response to the utterance.

Speech processing may be used in a variety of contexts, including allowing voice control of systems where touch control may not be preferred or available. For example, a system may allow voice control of a system while a user is operating a vehicle. One category of tasks that relates to voice control by an operator of a vehicle relates to a primary driving operation of a vehicle or supervision of a vehicle engaged in autonomous (or semi-autonomous) driving operations. Another category of tasks that relates to voice control by an operator of a vehicle relates to secondary operations that may be performed during operation of a vehicle, such as navigation, making calls, listening to music, changing climate settings, operating lighting, locking doors, opening the trunk, requesting vehicle information, etc.

A speech-controlled computing system may answer user requests requesting the output of content and/or performance of one or more actions such as the driving operations and/or other vehicle operations described above. Generally, input data received by the various speech processing systems and components described herein may comprise natural language input data. Natural language input data may be in the form of spoken user utterances (e.g., a spoken user request), text data (e.g., a request typed by a user), audio data, and/or some combination of spoken user utterances, text data, and/or audio data.

The system may be configured with multiple applications (e.g., thousands, tens of thousands, or more applications) that can be used to potentially respond to a user request. Applications may be referred to herein as "skills". For example, the system may include vehicle control skills, climate control skills, equipment operations skills, music skills, video skills, calendar skills, timer skills, general knowledge answering skills, game skills, etc.

The invocation of a skill by a user's utterance may include a request that an action be taken. The skill may be effective to generate a command based on the request that can be transmitted (e.g., sent according to a predetermined communications protocol) to a control system that will cause that action to be executed. For example, the user's utterance may be, "Set the cabin temperature to 73 degrees." In response, a "smart car" system may cause the car's climate control system to set the target temperature to 73 degrees. Examples of skills include voice-enabled applications invoked by the Siri system from Apple Inc. of Cupertino, Calif., voice-enabled actions invoked by the Google Assistant system from Google LLC of Mountain View, Calif., Dragon speech recognition software from Nuance Communications of Burlington, Mass., the Cortana system from Microsoft of Redmond, Wash., or voice-enabled skills invoked by the Alexa system from Amazon.com, Inc. of Seattle, Wash. The number of applications/skills continues to grow and the rate of growth is increasing as developers become more accustomed to application programming interfaces (APIs) and application development kits provided for the voice service. Rule-based approaches and/or predefined utterance matching have been used in some systems for processing requests spoken in a certain format to invoke a particular application. In at least some examples, a "skill," "skill component," and the like may be software running on a computing device, similar to a traditional software application running on a computing device. Such skills may include a voice user interface in addition to or instead of, in at least some instances, a graphical user interface, smart home device interface, and/or other type of interface.

In at least some examples, a "skill," "skill component," and the like may be software that is run by a third party, to the herein disclosed speech processing system, without the third party provisioning or managing one or more servers for executing the skill. In such an implementation, the system may be triggered to run a skill in response to the third party calling the system via the Internet or a mobile application. Such implementation may include, but is not limited to, Amazon's AWS Lambda.

In at least some examples, a "skill," "skill component," and the like may be securely run by a third party, to the herein disclosed system, (such as a vehicle manufacturer) without the third party's device(s) being connected to the Internet. Internet of Things (IoT) devices of a third party may use, for example Amazon's AWS lambda functions, to interact with system resources and transmit data to the system (which may, in at least some implementations, be configured by the backend or other type of remote system). Such implementation may include, but is not limited to, Amazon's AWS Greengrass. For example, AWS Greengrass may extend the herein disclosed system to IoT devices so such devices can act locally on data they generate, while still using the herein disclosed system for data management, analytics, and storage.

Additionally, in at least some examples, functionality described herein may be implemented by software (e.g., applications) executing on a computing system associated with a vehicle, on a mobile device, or on any other client-side system associated with a vehicle or other system to which safety regulations and/or other protocols are applicable. For example, Javascript code and/or any type of instructions executing on a system local to the system (e.g., a computing device associated with the vehicle, a mobile device, etc.) may implement various components of the systems described below.

In various examples, statistical NLU may be used to reduce the cognitive burden on the user. In an NLU-based approach, user utterances are typically classified into one or more intents for one or more supported skills (or for an unsupported skill) followed by further skill-dependent intent and slot analyses (e.g., intent classification and entity extraction). In various examples, statistical NLU may be used to determine a list of intents and/or skills that the user intended to invoke. The list of intents (and/or other NLU results) may be ranked using a ranker component. The ranked list of NLU results may be stored by an orchestration component. NLU processing is described in further detail below.

Vehicles, and other equipment, systems, and/or machinery, are increasingly being equipped with various sensors (e.g., vehicle sensors such as automobile sensors) used to detect current conditions (e.g., environmental conditions related to the vehicle) and/or to aid a driver or operator in performing various tasks related to the vehicle, equipment, and/or system. For example, a vehicle may be equipped with one or more sensors configured to detect environmental conditions, such as when the vehicle is inadvertently drifting between lanes of a road. For further example, a vehicle may be equipped with one or more sensors that enable the vehicle to detect the proximity of another vehicle and automatically apply the vehicle's brakes in certain instances. Vehicles are increasingly equipped with microphones to allow spoken requests from a user and/or to allow mobile communication. Further, a vehicle may comprise one or more controller devices (e.g., processing devices) and/or vehicle systems effective to receive signals from sensors and from various components of the car. For example, a controller device may receive a signal from an internal vehicle temperature sensor indicating the temperature inside the cabin of the vehicle. In another example, a controller device may receive a signal from an external vehicle temperature sensor indicating the temperature outside the car. In another example, a controller device may receive a signal indicating that the parking brake is engaged. Although specific sensors and sensor data (e.g., sensor data indicating environmental conditions) are described above, the specific examples are not exhaustive and other environmental conditions and/or other conditions related to a vehicle or other monitored system may be monitored using various sensor systems and/or communication systems.

In some examples, an operator (e.g., a driver or passenger in a car) may issue a request (e.g., a spoken request that may be transformed into a control signal using the various speech-processing techniques described herein, or a request made using a user interface provided by a manufacturer of the car) to perform a particular action that contravenes a protocol such as an applicable safety regulation, best practice, and/or pre-defined rule. In various examples, logic may be provided to determine that the requested action contravenes the applicable protocol. The determination that a particular requested action contravenes a protocol may be determined based on a variety of factors, such as sensor data and/or metadata regarding one or more systems (e.g., device identification data, device state data, global positioning data, telemetry data, etc.). For example, a particular safety regulation or other protocol may be associated in a data structure with a range of permissible values and/or a range of impermissible values associated with the regulation. In further examples, output data may be stored in the data structure in association with the safety regulation. In some examples, the output data may indicate that performance of a requested action cannot be completed when a value (or values) of the sensor data is outside the range of permissible values associated with the particular safety regulation (or other applicable protocol).

In accordance with various techniques described herein, when a requested action is denied due to the requested action contravening a protocol, a message may be generated and may be output to the operator in a perceivable form. For example, a skill may determine, based on sensor data and/or various other metadata, that a requested action and/or user intent to operate a vehicle in a certain way or a system of the vehicle in a certain way violates an applicable protocol. As described in further detail below, in at least some examples, the applicable protocol may be determined based on the sensor data and/or other metadata received from the vehicle. Accordingly, the skill may not generate an executable action corresponding to the user request and/or user intent. Instead, the skill may generate explanatory output data that explains that the requested action cannot be performed due to the currently applicable protocol. The output data may be text data, image data, audio data, or the like, and may be output by the vehicle or other applicable system.

In various examples, instead of a skill configured to block requested actions based on applicable protocols, a filtering component downstream from the skill may determine that an executable command configured to generate a requested action would contravene an applicable protocol. In such an example, the downstream filtering component may receive metadata and/or sensor data related to a vehicle or other system. Additionally, the downstream filtering component may receive protocol data indicating protocols related to the vehicle or other system and parameters thereof. For example, a downstream filtering component may receive protocol data indicating that a vehicle cannot be put into "drive" until a handbrake is disengaged. A user may request that the vehicle be put into drive or that an autonomous vehicle proceed to a destination. Speech processing may generate a drive intent related to operation of the vehicle to proceed to the destination. A skill related to operation of the vehicle may process the drive intent and generate an action (e.g., an executable command or directive) executable by the vehicle to cause the vehicle to drive to the destination. The downstream filtering component may intercept the action prior to execution of the action by the vehicle. In various examples, the downstream filtering component may be executed by a computing device of the vehicle. The downstream filtering component may receive sensor data indicating that the handbrake is currently engaged. The downstream filtering component may determine that the drive action violates a protocol requiring that the handbrake be disengaged before shifting the vehicle transmission into drive. The downstream filtering component may, in effect, filter out the drive action and may generate explanatory output data that explains that the requested action cannot be performed due to the currently applicable protocol. The output data may be text data, image data, audio data, or the like, and may be output by the vehicle or other applicable system.

In various examples, when a skill or other component (e.g., a downstream filtering component) determines that a particular protocol is applicable, the skill or other component may be effective to generate blocking data to block one or more domains and/or skills that are effective to generate a control command (e.g., a control signal) effective to carry out the requested action. In at least some examples, intent-blocking data, domain-blocking data, and/or skill-blocking data may be generated and stored in a session manager of the speech-processing system and/or computing device. Blocking data may include indicator data, such as a flag comprising one or more bits, indicating that an intent, domain, and/or skill is currently unavailable for processing the input command. Such data may be used to indicate that in a current state, the vehicle is unable to access the blocked intents, skills, and/or domains due to a safety regulation or other protocol.

Instead of the blocking data described above, other implementations may use lists and/or databases of prohibited intents, skills, directives (e.g., executable actions generated by skills for execution by a client device, such as a vehicle or other system) and/or domains. For example, when a currently-applicable protocol is determined, a list of prohibited intents, domains, directives, and/or skills may be generated and stored in memory. When a speech processing request is received a skill and/or downstream filtering component may determine whether or not the request implicates a prohibited intent, domain, directive, and/or skill by comparing the intents, domains, and/or skills determined for the speech-processing request with the intents, domains, and/or skills in the prohibited list. The prohibited list may be updated when a new protocol has been implicated by changing conditions related to vehicle 110. Similarly, intents, domains, and/or skills on the prohibited list may be removed from the prohibited list when the protocol prohibiting the intents, domains, and/or skills is no longer applicable (e.g., due to changing conditions related to a vehicle).

In various other examples, metadata associated with a particular request may be used to route the command to a skill associated with the device from which the request issues. For example, a request to perform a particular action in a car manufactured by Company X may include metadata indicating that the request has been initiated by a particular device and/or class of devices. In response, a speech-processing system may pass one or more intents determined from the request to a particular skill that is associated with the particular device and/or class of devices. In the example, the skill may be developed by Company X. As previously described, the skill may include logic to determine that performing the requested action would contravene an applicable protocol and may generate a message indicating that the requested action cannot be carried out. In various examples, the skill may be effective to determine an applicable protocol based on sensor data and/or other metadata received from a processing system of the vehicle. In at least some examples, metadata received from the vehicle may include sensor data of the vehicle.

In various further examples, data representing the request may be stored in a memory associated with the skill and/or with the downstream filtering component. The skill may be effective to determine when the condition that prevents execution of the request is no longer applicable. In at least some examples, the skill may generate the command to carry out the user request when the condition is no longer present. In other examples, the NLU or other speech-processing component may cease blocking the intent and/or domain related to carrying out the user request when the condition is no longer present. For example, the NLU or other speech-processing component may reset a flag indicating that a particular skill and/or intent is currently blocked when the condition is no longer present. Accordingly, the stored request may be executed by the speech-processing system to generate the applicable command when the condition preventing generation of the command is no longer present.

In at least some examples, a vehicle controller, a skill, and/or the downstream filtering component may determine a mapping (e.g., in a data structure stored in memory) between sensor data and/or other metadata describing a current state of the vehicle and a protocol such as a safety regulation. A determination may be made that a requested action violates the safety regulation by consulting the data structure storing the various parameters of the safety regulation or other protocol. In at least some examples, output data (e.g., output text to be displayed on a screen and/or output audio to be played back via a vehicle speaker) may be mapped to the protocol and/or to one or more actions. Accordingly, if a user requests an action that is prohibited by a particular protocol, the vehicle controller, downstream filtering component, and/or skill may determine output data associated with the prohibited action that explains to the user why the system is currently unable to perform the requested action.

In various examples, output messages generated using various different techniques described herein may be provided to a user using various different techniques. For example, an output message including explanatory text may be generated. In some further examples, text may be transformed into audio by a TTS component and may be output through vehicle speakers. In some examples, text may be displayed on a user interface of the vehicle. In some examples, graphics, warning sounds, flashing of indicator lights, and/or other perceivable signals may be used instead of text and/or computer-generated speech. Generally, output messages may alert a user that the requested action is unable to be carried out at the current time (or time period) and/or may explain one or more reasons why the action is currently unable to be carried out. Additionally, in some examples, output messages may indicate that the requested action will be taken when the condition preventing the taking of the action is no longer present.

Although the embodiments described herein reference vehicle control systems (and more particularly automotive control systems) for illustrative purposes, the techniques are equally applicable to any systems that are subject to control and/or oversight protocols. Examples may include hospital control systems and/or medical device control systems, utility control systems, transportation control systems (e.g., train systems, flight systems, boat systems), machinery operation/control systems, factory/manufacturing control systems, etc. The previous list is for illustrative purposes and is not exhaustive. Other applications apart from those specifically listed may use and/or benefit from the various techniques described herein.

FIG. 1 is a conceptual illustration of a system 100 configured to determine an inability to perform a requested action and to generate an output message related to the inability to perform the requested action, according to various embodiments of the present disclosure.

Although the figures and discussion illustrate certain operational steps of the system 100 in a particular order, in other embodiments the steps described may be performed in a different order (as well as certain steps removed or added). As shown in FIG. 1, the system 100 includes a vehicle 110, speech-processing computing device(s) 120, and skill computing device(s) 125, in communication with each other across one or more networks 104. The speech-processing computing device(s) 120 (which may be one or more different physical devices) may be capable of performing speech processing (e.g., ASR and NLU) as well as non-speech processing operations as described herein. A single speech-processing computing device 120 may perform the speech processing described herein, or multiple speech processing computing devices 120 may combine to perform the speech processing described herein. Vehicle 110 may refer to a car, truck, SUV, plane, boat, motorcycle, crane, or the like. In various examples, instead of vehicle 110 a different control system may be used instead. Any system having applicable protocols (e.g., safety protocols, best practice protocols, device-specific protocols, etc.) related to the permissibility of execution of one or more actions may be applicable to the various techniques described herein and may be used in place of vehicle 110.

In various example embodiments, one or more of the actions shown in FIG. 1 and described herein may be performed by one or more of the different components. For example, various speech-processing operations may be performed at one or more computing devices associated with vehicle 110, at speech-processing computing device(s) 120, and/or at skill computing device(s) 125. In addition, although separately depicted in FIG. 1, in some examples, speech-processing computing device(s) 120 and/or skill computing device(s) 125 may be at least partially executed by a computing device of vehicle 110. In at least some examples, computing devices of vehicle 110 may include mobile computing devices (e.g., mobile phones) that may act as a bridge in communications between the vehicle 110 and the speech-processing computing device(s) 120. In at least some further examples, a mobile computing device configured in communication with vehicle 110 may execute one or more components of the speech-processing system 120 described herein. In some examples, a mobile device or other computing device associated with vehicle 110 may be configured to provide limited speech-processing capability even when no connection to speech processing computing device(s) 120 is available. For example, a mobile phone or other computing device associated with vehicle 110 may be effective to process speech processing requests related to the control of music and/or climate systems of vehicle 110 even when no connection to speech-processing computing device(s) 120 is available.

In various implementations, one or more of the various operations depicted in FIG. 1 may be omitted. For example, if the input request received at action 128 is not a natural language request (e.g., if the input request is a button push or other vehicle system control input) actions 128, 130, and/or 131 may be omitted.

At action 128 vehicle 110 and/or a processing unit of vehicle 110 may receive a request. The request may be, for example, a signal generated in response to a button push and/or selection of a virtual button or selectable element on a user interface such as a touch screen display. In other examples, the request may be a signal generated by manipulating various other controls of vehicle 110 (e.g., turning a knob, depressing a pedal, activating a switch, etc.). In some further examples, the request may be a spoken command. For example, an operator of vehicle 110 may say "Computer, set cabin temperature to 74 degrees". A microphone of vehicle 110 may convert the spoken audio signal into an electrical signal. The electrical signal representing the request may be sent to a speech-processing component of vehicle 110 and/or to speech-processing computing device(s) 120. ASR may be used to generate text data representative of speech representing the request. At action 130, NLU may be used to generate one or more semantic interpretations of the text data. As described in further detail below, the NLU may determine one or more intents that may correspond to one or more actions that may be taken in response to the spoken command. The results of the NLU processing may be sent to skill computing device(s) 125 at action 131.

In an example, the request received at action 128 (which may be received via any input means), may be a command to set the cabin temperature of vehicle 110 to 74 degrees Fahrenheit. At action 132 sensor data and/or metadata may be received by a skill of skill computing device(s) 125. Sensor data may include data generated by sensors configured in communication with vehicle 110, such as speed, outside temperature, cabin temperature, oil pressure, tire pressure, engine temperature, warning information, indications of headlight operation, proximity data, LIDAR data, etc. Metadata may include a device identifier associated with vehicle 110 (e.g., an automobile identifier) and/or a processing system thereof (e.g., a speech-processing system of vehicle 110), timestamp data, user account data, device status data, etc. Additionally, sensor data from vehicle 110 may be encoded as metadata.

At action 134, a determination may be made that there is currently an inability to execute the request received at action 128. The determination may be made by one or more computing devices of vehicle 110, by skill computing device(s) 125, and/or by a separate component such as applicable protocol recognition component 295 described below in reference to FIG. 2. In an example embodiment, a speechlet executing on skill computing device(s) 125 may determine based on a device ID in metadata received at action 132 that execution of a cabin-heating directive corresponding to the request "Set cabin temperature to 74 degrees" would contravene a protocol corresponding to vehicle 110. In various examples, the determination at action 134 may be made based on a protocol (e.g., a safety regulation) that is implicated by the at least one of the requested action and the current set of conditions, metadata, and/or sensor data related to vehicle 110. For example, the sensor data may implicate a particular safety regulation and the requested action may represent an action that is prohibited by the implicated safety regulation.

The skill may determine one or more applicable protocols associated with the vehicle 110. For example, the skill may determine a safety regulation that requires that defrost be prioritized over cabin temperature when the outside temperature of the vehicle 110 is below a certain temperature. The skill may determine, from sensor data received at action 132, that the current temperature outside the car is below the temperature threshold. The skill may further determine that executing a heating directive corresponding to the request "Set cabin temperature to 74 degrees" would require diverting heat from the defrost system to the cabin. The skill may determine that executing the directive would violate the safety regulation. Accordingly, the skill may determine that the action cannot be taken at the current time. In various examples, a system of vehicle 110 and/or a separate layer or component of system 100 may instead make the above determinations based on the sensor data, the metadata, applicable protocol data (e.g., the applicable regulations), and the heating directive generated by the applicable skill, and may block execution of the heating directive in order to prevent the applicable regulation or protocol from being contravened. In the above example, a cabin heating directive may be blocked until the defrost system has been run for the requisite amount of time.

In various other examples, the various processing described above may instead be executed by a system of vehicle 110 and/or by a filtering component. In at least some examples, speech-processing computing device(s) 120, the downstream filtering component described above, and/or skill computing device(s) 125 may be integrated into vehicle 110. Instead of sending the sensor data and/or metadata to an external system, one or more processing units of vehicle 110 may be effective to determine various state data and sensor data. For example, a processing unit of vehicle 110 may determine that the outside temperature is below a threshold temperature (for the applicable regulation), that the user has engaged the interior cabin heating control, and that use of cabin heat would currently divert heat from the defrost to the cabin, contravening a safety regulation. In the current example, the processing unit may not permit the heating of the cabin until such heating is permissible.

At action 136, an output may be determined. The output may indicate that the vehicle 110 is currently unable to perform the requested action. In various examples, the output may indicate a reason why the vehicle 110 is currently unable to perform the requested action. The output may take various forms depending on the desired implementation. For example, the output may be generated by a skill associated with the manufacturer of vehicle 110. The output of the skill may be text explaining that performance of the requested action would contravene an applicable safety standard. The text may be sent to an orchestrator of a speech-processing system that may be executed by computing device(s) of speech-processing computing device(s) 120. The orchestrator may send the text to a TTS component of speech-processing computing device(s) 120. The TTS component may generate and audio file that may be sent to vehicle 110 for playback. In various other examples, the skill may be effective to generate a command to display graphics and/or text that may be rendered on a display of vehicle 110.

In another example, a system of vehicle 110 (e.g., such as a downstream filtering component) may determine the output. A particular set of conditions (e.g., the outside temperature, the defrost requirement, and the input cabin temperature request) may be mapped to a particular response (e.g., output data) in a data structure of the processing unit of the vehicle 110. The response may be output on a display, speaker, and/or other indicator of vehicle 110 and/or may be sent to speech-processing computing device(s) 120 to be converted into speech by a TTS component. If the response is converted into speech by a TTS component, the speech may be output by a speaker of vehicle 110. In at least some examples, the TTS component and/or other speech-processing components of speech-processing computing device(s) 120 and/or skill computing device(s) 125 may be local to vehicle 110.

Figure 2:
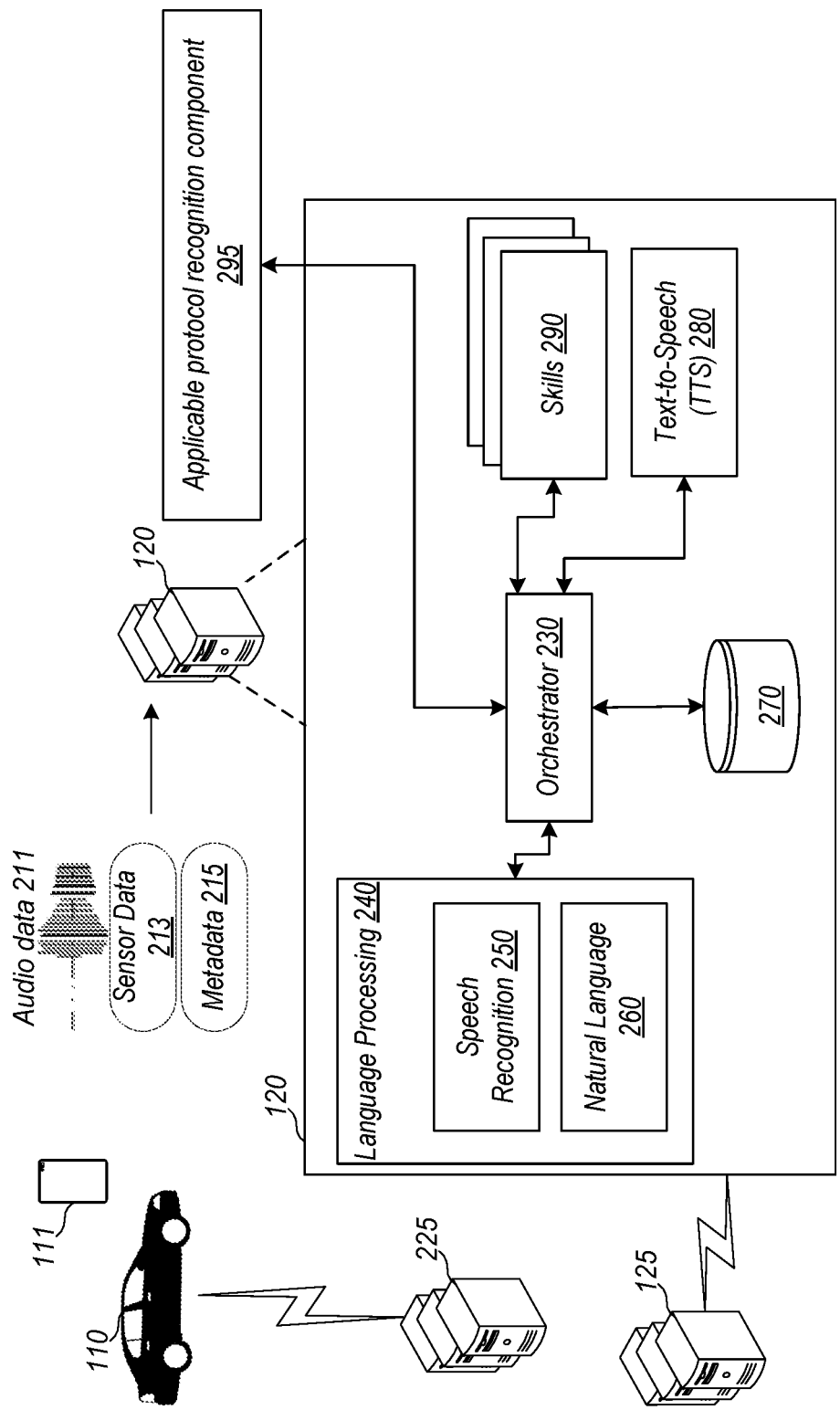
FIG. 2 is a conceptual diagram of components of a speech-processing device(s) according to various embodiments of the present disclosure.

A system according to the present disclosure may operate using various components as described in FIG. 2. The various components illustrated FIG. 2 may be located on a same or different physical devices. Communication between various components illustrated in FIG. 2 may occur directly or across a network(s) 104. The vehicle computing system may capture audio using an audio capture component, such as the microphone(s) 570 (FIG. 5). In various examples, a mobile computing device 111 (e.g., a mobile phone) may capture the audio. The mobile computing device 111 may communicate with one or more computing devices associated with vehicle 110. In various examples, the mobile computing device 111 may serve as a communication link between vehicle 110 and speech processing computing device(s) 120. The vehicle computing system sends audio data 211, corresponding to the audio, to the speech-processing computing device(s) 120 (e.g., through a computing device associated with vehicle 110 and/or through mobile computing device 111). The vehicle computing system (e.g., a computing device associated with vehicle 110) may include a wakeword detection component that detects when input audio includes a spoken wakeword. In some instances, the vehicle computing system may be configured to send audio data to the speech-processing computing device(s) 120 (e.g., via the vehicle server(s) 225) when the vehicle computing system detects a spoken wakeword. The vehicle computing system may also send sensor data 213 and/or metadata 215 (e.g., including encoded states of vehicle components, vehicle/device identifiers, etc.) to the speech-processing computing device(s) 120. The metadata 215 may be created by a computing component of the vehicle based on sensor data 213 and/or based on operational states of various components of vehicle 110, thus enabling the vehicle 110 to process the sensor data 213 (for example using a trained model) to determine various operational states of vehicle 210 and various external conditions (e.g., temperature) that may be affecting operation of vehicle 110. The vehicle 110 thus may send some data corresponding to the sensors to the speech-processing computing device(s) 120 (either directly or through one or more intermediate devices such as a vehicle server 225) where the data corresponding to the sensors may include the sensor data 213 and/or the metadata 215.

Upon receipt by the speech-processing computing device(s) 120, the audio data 211 may be sent to an orchestrator component 230. The orchestrator component 230 may include memory and logic that enables the orchestrator component 230 to transmit various pieces and forms of data to various components of the system. In various examples, orchestrator component 230 may comprise a session manager that may store blocking data generated in response to a particular action requested by a user contravening an applicable protocol. Blocking data may be, for example, indicator data, such as a flag or other data representation effective to block a particular intent, skill, and/or domain that is prohibited by a currently applicable protocol. As described in further detail below, applicable protocol recognition component 295 and/or one or more of skills 290 may be effective to block particular intents, skills, and/or domains while current conditions of vehicle 110 implicate one or more protocols. For example, if a skill 290 determines that a safety standard is implicated based on sensor data 213 and/or metadata 215, skill 290 may send a signal to speech processing computing device(s) 120 to block intents, skills, and/or domains related to actions that would contravene the applicable safety standard.

In various examples, orchestrator component 230 may be triggered to check (or may periodically, semi-periodically, or randomly check) sensor data 213 and/or metadata 215 to determine whether the conditions that implicate the particular protocol remain valid. In various examples, when a determination is made that the particular protocol is no longer valid (e.g., when conditions have changed such that the safety regulation is no longer applicable), the blocking data may be removed (e.g., the flag may be reset) and the requested action may be processed (e.g., by accessing the previously-blocked intent, skill, and/or domain).

The orchestrator component 230 may send the audio data 211 to a language processing component 240. An ASR component 250 (e.g., a speech recognition component) of the language processing component 240 transcribes the audio data 211 into one or more hypotheses representing speech contained in the audio data 211. The ASR component 250 interprets the speech in the audio data based on a similarity between the characteristics of the audio data corresponding to the speech and pre-established language models. For example, the ASR component 250 may compare the audio data 211 with models for sounds (e.g., subword units such as phonemes) and sequences of sounds to identify words that match the sequence of sounds in the speech represented in the audio data 211. The ASR component 250 may send text data generated thereby to an Natural language component 260 of the language processing component 240. The text data output by the ASR component 250 may include a top scoring hypothesis of the speech represented in the audio data 211 or may include an N-best list including a group of hypotheses of the speech represented in the audio data 211, and potentially respective scores ASR processing confidence scores.

The Natural language component 260 attempts to make a semantic interpretation of the phrases or statements represented in the text data input therein. That is, the Natural language component 260 determines one or more meanings associated with the phrases or statements represented in the text data based on individual words represented in the text data. The Natural language component 260 interprets a text string to derive an intent of the user (e.g., an action that the user desires be performed) as well as pertinent pieces of information in the text data that allow a device (e.g., the vehicle 110, the speech-processing computing device(s) 120, the skill computing device(s) 125, etc.) to complete the intent. For example, if the text data corresponds to "Set cabin temperature to 74 degrees", the Natural language component 260 may determine the user intended to invoke a cabin-heating intent with a temperature value slot of 74 degrees Fahrenheit.

In some examples, the speech-processing computing device(s) 120 may include an applicable protocol recognition component 295. The applicable protocol recognition component 295 may take as input the sensor data 213, and/or metadata 215. Additionally, one or more actions (e.g., directives) determined by one or more skills 290 based on intent data provided by natural language component 260 may be sent to applicable protocol recognition component 295. The applicable protocol recognition component 295 may determine applicable protocols to be followed based on sensor data 213 and/or metadata 215. For example, sensor data 213 indicating that an emergency brake of vehicle 110 is engaged may be received by applicable protocol recognition component. Additionally, the actions received from skill 290 may indicate that the user has requested that vehicle 110 begin driving to a destination. Applicable protocol recognition component 295 may determine that driving while the emergency brake is engaged violates a protocol related to operation of the vehicle. In some examples, applicable protocol recognition component 295 may make such a determination based on mappings of protocols to particular vehicle conditions stored in a memory (e.g., profile storage 270 or another memory). In other examples, applicable protocol recognition component 295 may be a trained model effective to determine relationships between sensor data and protocols. In at least some examples, applicable protocol recognition component 295 may send signals to speech processing computing device(s) 120 effective to block domains, intents, and/or skills related to operation of vehicle according to currently-applicable protocols.

Additionally, applicable protocol recognition component 295 may be effective to generate an output message indicating that the requested action cannot be taken and explaining why the requested action cannot be taken. In at least some examples, applicable protocol recognition component 295 may be executed by a computing device of vehicle 110 and/or by vehicle servers 225. In some further examples, the functionality described above with respect to the applicable protocol recognition component 295 may instead be implemented through one or more skills 290. For example, one or more skills 290 may correspond to a manufacturer of vehicle 110 and may be effective to determine protocols associated with operation of vehicle 110. Additionally, after determining an appropriate action (e.g., a directive) corresponding to natural language processing results, the one or more skills 290 may determine that the action contravenes the protocol.

The one or more skills 290 may determine output data indicating that the action cannot be performed due to the applicable protocol. As described herein, the output data may be text that may be displayed, audio that may be played back, and/or some other indicator used to indicate an ability to perform the requested action due to the applicable protocol. In at least some examples text output data may be sent to TTS component 280 which may generate audio data corresponding to the text for playback by an audio system of vehicle 110.

The speech-processing computing device(s) 120 may include a profile storage 270. The user profile storage 270 may include a variety of information related to individual users, individual vehicles (or other devices), groups of users, etc. that interact with the system. The user profile storage 270 may include one or more profiles. Each profile may be associated with a different identifier (ID), such as a vehicle ID. A profile may be an umbrella profile specific to a group of users. That is, a profile encompasses two or more individual user profiles, each associated with a respective unique user ID. For example, a profile may be a household profile that encompasses user profiles associated with multiple users of a single household. Similarly, a profile may be associated with two or more users of a household and the vehicles of those users. A profile may include preferences shared by all the user profiles encompassed thereby. Each user profile encompassed under a single profile may include preferences specific to the user associated therewith. That is, each user profile may include preferences unique from one or more other user profiles encompassed by the same profile. A user profile may be a stand-alone profile or may be encompassed under a customer profile. As illustrated, the user profile storage 270 is implemented as part of the speech-processing computing device(s) 120. However, it should be appreciated that the user profile storage 270 may be located proximate to the speech-processing computing device(s) 120, or may otherwise be in communication with the speech-processing computing device(s) 120, for example over the network(s) 104. Profile storage 270 may store one or more protocols (e.g., safety regulations and/or operating protocols) related to vehicle 110.

The speech-processing computing device(s) 120 may include one or more skills 290 configured to perform the various techniques herein disclosed, as well as other, processes. The speech-processing computing device(s) 120 may also be in communication with one or more skill computing device(s) 125 that execute one or more skills configured to perform the herein disclosed, as well as other, processes. To enable a skill 290 to execute, orchestrator component 230 may send output from the Natural language component 260 (e.g., text data including tags attributing meaning to the words and phrases represented in the text data), and optionally output from the user recognition component 295 and/or data from the profile storage 270, to the skill 290.

The speech-processing computing device(s) 120 may also include a TTS component 280 that synthesizes speech (e.g., generates audio data) corresponding to text data input therein. The TTS component 280 may perform speech synthesis using one or more different methods. In one method of synthesis called unit selection, the TTS component 280 matches text data against one or more databases of recorded speech. Matching units are selected and concatenated together to form audio data. In another method of synthesis called parametric synthesis, the TTS component 280 varies parameters such as frequency, volume, and noise to create an artificial speech waveform output. Parametric synthesis uses a computerized voice generator, sometimes called a vocoder. In various examples, the TTS component 280 may output messages indicating that one or more requested actions cannot be taken due to a particular protocol related to vehicle 110.

The various components (230/240/250/260/280/290/295) described above may exist in software, hardware, firmware, or some combination thereof.

The system of the present disclosure may also include vehicle servers 225 that communicate with vehicles 110 via wireless communications, such as WiFi, Bluetooth, etc. A vehicle server(s) 225 may receive data (e.g., sensor data 213 and/or the metadata 215) from the vehicle 110 and transmit the data to components of the speech-processing computing device(s) 120 via a skill 290. In various examples, data sent between the vehicle server(s) 225 and the speech-processing computing device(s) 120 may include metadata 215 which may include a vehicle ID (e.g., so the speech-processing computing device(s) 120 knows the endpoint vehicle), a driver name, a driver ID, etc. A vehicle 110 associated with a vehicle server(s) 225 may be referred to as a vehicle client device. In some examples, the speech-processing computing device(s) 120 may only execute when the speech-processing computing device(s) 120 receives audio data corresponding to user input from the vehicle 110.

The vehicle server(s) 225 and/or the speech-processing computing device(s) 120 may reside in the vehicle 110, in a cloud computing environment, or some combination thereof. For example, the vehicle 110 may include computing equipment, some portion of which is configured with all/some of the components/functionality of speech-processing computing device(s) 120 and another portion of which is configured with all/some of the components/functionality of vehicle server(s) 225. The vehicle may then perform a variety of functions on its own (such as when remote communications are unavailable), and/or may communicate (when capable) with remote based vehicle server(s) 225 and/or the speech-processing computing device(s) 120 to perform other functions. Alternatively, all of the functionality may reside on the vehicle 110 or remotely.

Figure 3:
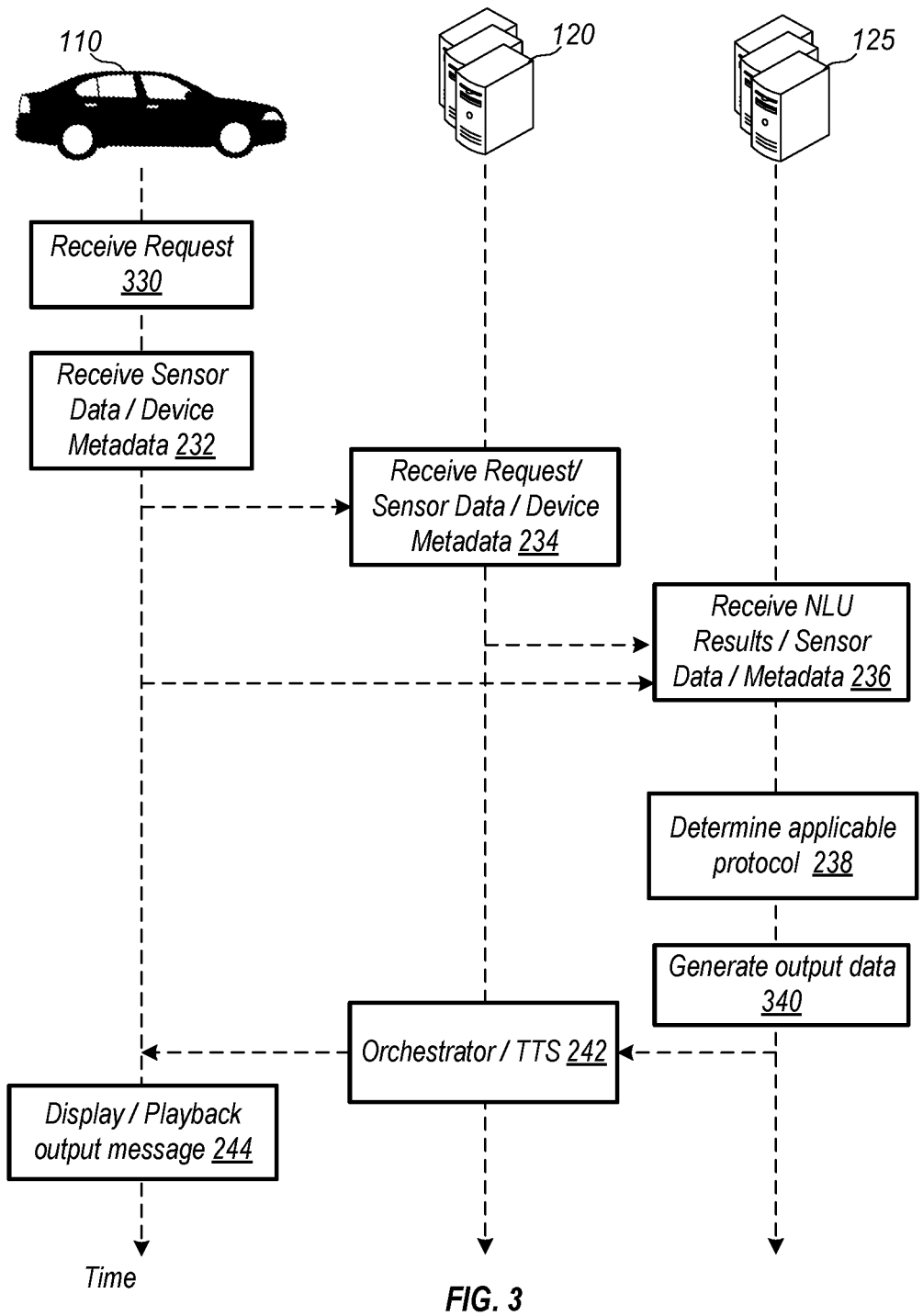
FIG. 3 is a timing diagram illustrating an example set of operations that may be used by a vehicle voice user interface, in accordance with various embodiments described herein.

FIG. 3 is a timing diagram illustrating an example set of operations that may be used by a vehicle voice user interface, in accordance with various embodiments described herein. In the example embodiment depicted in FIG. 3, vehicle 110 may receive a request 330. In at least some examples, the request 330 may be a spoken request by an operator of vehicle 110 to perform an action related to vehicle 110. In some other examples, the request may be a text-based request. In various natural language-processing systems, user requests to be processed by natural language processing may be referred to as "events". To continue the example provided above, the request 330 may be a spoken request to increase a cabin temperature of vehicle 110 to 74 degrees Fahrenheit.

Vehicle 110 and/or one or more processors of vehicle 110 may be effective to receive sensor data from various sensors of vehicle 110 at action 232. In the current example, vehicle 110 may receive temperature data from one or more temperature sensors effective to determine a temperature outside of the car. In various other examples, the external temperature may be received over a wireless network from a weather service based on the current location of vehicle 110. Additionally, the one or more processors of vehicle 110 may receive device metadata at action 232. Device metadata may be metadata describing vehicle 110, current conditions, state data, timestamp data, etc.

At action 234, the request, sensor data, and/or device metadata may be sent to speech-processing computing device(s) 120. As previously described, in at least some examples, speech-processing computing device(s) 120 and/or components thereof may be wholly or partially integrated into vehicle 110. Speech-processing computing device(s) 120 may perform speech processing on the request to determine one or more intents and/or skills associated with the request. In at least some examples, the domains, intents, and/or skills may be determined based at least in part on the metadata and/or sensor data as well as based on the request itself.

At action 236, skill computing device(s) 125 and/or a skill (or skills) of skill computing device(s) 125 may receive speech-processing results (e.g., NLU results) from speech-processing computing device(s) 120. Additionally, the skill or skills may receive sensor data and/or device metadata. The skill may determine an action (e.g., a directive) based on the NLU results (e.g., intent(s)), the sensor data, and/or the metadata.

In addition, at action 238, the skill(s) may determine currently applicable protocols based on metadata and/or sensor data received from speech-processing system 120 and/or directly from vehicle 110. The skill(s) may determine whether the action determined based on the NLU results contravenes any currently-applicable protocols. If the action contravenes a currently-applicable protocol the skill(s) may prevent execution of the action and may instead generate output data 340 explaining that the request cannot be completed due to the applicable protocol.

In various other examples, applicable protocol recognition component 295 (FIG. 2) of speech-processing computing device(s) 120 may determine one or more applicable protocols based on the device metadata and/or the sensor data. Applicable protocol recognition component 295 may be executed by skill computing device(s) 125 and/or by a system of vehicle 110. Applicable protocol recognition component 295 may determine that based on the current outside temperature heat may not be diverted from a defrost function of vehicle 110 to vents used to heat a cabin of vehicle 110 based on an applicable safety standard. In response, applicable protocol recognition component 295 may prevent execution of the action and may instead generate output data 340 explaining that the request cannot be completed due to the applicable protocol.

In some examples blocking an preventing execution of an action may comprise generating blocking data (e.g., an indicator flag) that indicates that a particular intent, skill, and/or domain is currently unavailable for processing. However, other implementations apart from blocking data are possible. For example, when a currently-applicable protocol is determined, a list of prohibited intents, domains, actions, and/or skills may be generated and stored in memory. When an action is determined by a skill, the applicable protocol recognition component 295 may determine whether or not the determined action corresponds with actions of the prohibited list. The prohibited list may be updated when a new protocol has been implicated by changing conditions related to vehicle 110. Similarly, actions (e.g., directives) on the prohibited list may be removed from the prohibited list when the protocol prohibiting the actions is no longer applicable (e.g., due to changing conditions related to vehicle 110).

At action 340 the skill may generate output data. The output data may be, for example, a message explaining to the user that the requested action may not be taken at the current time (or time period). In addition, in some examples, the output data may explain a reason why the requested action may not be taken. For example, the output data may be text that states "I'm sorry. Due to safety regulations heat cannot be diverted from defrost to the cabin until the defrost system has run for 10 minutes."

The output data may be passed from the skill computing device(s) 125 to speech-processing computing device(s) 120 at action 242. In various examples where the output data comprises text, the text may be sent to a TTS component of speech-processing computing device(s) 120 for generation of audio representing the text. In various other examples where the output data is to be output as text on a display, the text may be passed to the orchestrator of speech-processing computing device(s) 120. At action 244, the output data may be sent to vehicle 110 for output. If the output data has been converted to speech by the TTS component of speech-processing computing device(s) 120, the speech may be output via speakers of vehicle 110. If the output data is to be output as text, a display of vehicle 110 may display the text to alert the user why the request cannot be completed. In various examples, the skill and/or applicable protocol recognition component 295 may generate output data that may indicate that the requested action will be performed during a later time period when the applicable condition preventing execution of the action (e.g., according to a safety regulation) no longer persists.

In some examples, the vehicle 110, the skill, and/or speech-processing computing device(s) 120 may store state information (e.g., indicator data such as a flag) in a memory indicating that one or more protocols are currently applicable based on sensor data. In an example, execution of a request may be delayed when one or more protocols are applicable. Vehicle 110, the skill, and/or speech-processing computing device(s) 120 may periodically check the status of the memory to determine if the protocol is still applicable. If the protocol is no longer applicable the vehicle 110 and/or speech-processing computing device(s) 120 may prompt the user to determine whether the user would like for the an action associated with the request to be executed. For example, a user may request that the cabin heat be set to 74 degrees Fahrenheit. However, a particular protocol (e.g., a safety regulation applicable to vehicles) may prevent execution of the directive used to set the cabin heat to 74 degrees, as the protocol may require that the defrost be run for 10 minutes prior to heating the cabin. Vehicle 110, the skill, and/or speech-processing computing device(s) 120 may store indicator data indicating the protocol, the action/directive, and the length of time that the defrost has been running. When a determination is made that the defrost has been run for the applicable amount of time (e.g., 10 minutes), the skill, vehicle 110, and/or speech-processing computing device(s) 120 may prompt the user whether the user would like the vehicle 110 to set the cabin temperature to 74 degrees. Alternatively, the vehicle 110 may automatically complete the request when the protocol is no longer applicable (e.g., after defrosting the car for 10 minutes the vehicle may set the cabin heat to 74 degrees and may begin heating the cabin).

Figure 4:
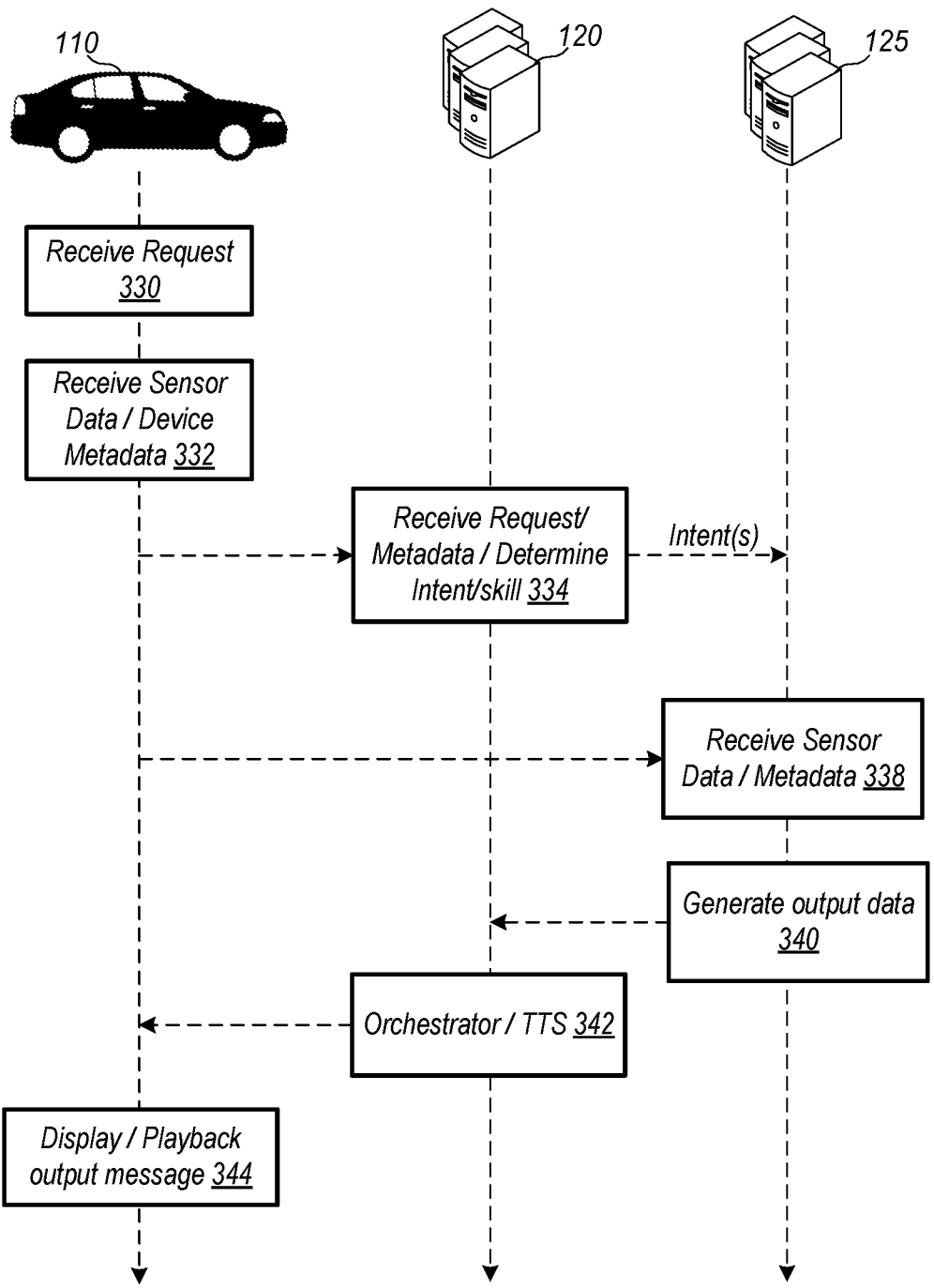
FIG. 4 is a timing diagram illustrating another example set of operations that may be used by a vehicle voice user interface, in accordance with various embodiments described herein.

FIG. 4 is a timing diagram illustrating another example set of operations that may be used by a vehicle voice user interface, in accordance with various embodiments described herein.

In the example embodiment depicted in FIG. 4, vehicle 110 may receive a request 330. In at least some examples, the request 330 may be a spoken request by an operator of vehicle 110 to perform an action related to vehicle 110. To continue the example provided above, the request 330 may be a spoken command to increase a cabin temperature of vehicle 110 to 74 degrees Fahrenheit.

Vehicle 110 and/or one or more processors of vehicle 110 may be effective to receive sensor data from various sensors of vehicle 110 at action 332. In the current example, vehicle 110 may receive temperature data from one or more temperature sensors effective to determine a temperature outside of the car. In various other examples, the external temperature may be received over a wireless network from a weather service based on the current location of vehicle 110. Additionally, the one or more processors of vehicle 110 may receive device metadata at action 332. Device metadata may be metadata describing vehicle 110 (e.g., a vehicle ID), current conditions, state data, timestamp data, etc.

At action 334, the request and/or device metadata may be sent to speech-processing computing device(s) 120. As previously described, in at least some examples, speech-processing computing device(s) 120 and/or components thereof may be wholly or partially integrated into vehicle 110. Speech-processing computing device(s) 120 may perform speech processing on the request to determine one or more intents and/or skills associated with the request. In various examples, speech-processing computing device(s) 120 may determine a skill associated with vehicle 110 based on the metadata sent at action 332. In some examples, vehicle 110 may not send sensor data from the vehicle 110 to speech-processing computing device(s) 120. Instead, a manufacturer of vehicle 110 may send sensor data related to vehicle 110 directly to a skill associated with the manufacturer of the vehicle 110 to alleviate privacy concerns and/or to maintain stewardship of customer data. However, in at least some examples, intents determined based on the request 330 and/or based on intents permitted by applicable protocol recognition component 295 based on currently-applicable protocols may be sent to the appropriate skill executed by skill computing device(s) 125.

At action 338, vehicle 110 may send sensor data and/or metadata to the selected skill. As previously described, in various examples, the skill may be specific to the vehicle 110 and/or to the manufacturer of vehicle 110. In various examples, domains and/or intents of the particular skill may have been blocked by applicable protocol recognition component 295 based on the currently-applicable protocols. In some other examples, the skill may be effective to determine the currently applicable protocol based on the sensor data and/or metadata received from vehicle 110.

In the current example, the skill may be effective to determine that based on the current outside temperature heat may not be diverted from a defrost function of vehicle 110 to vents used to heat a cabin of vehicle 110 based on an applicable safety standard. In some examples, the skill may determine the appropriate action to take based on the applicable protocol, the NLU results (e.g., those intents that were not blocked), the sensor data, and/or the metadata. As previously described, in various examples, a separate component, such as applicable protocol recognition component 295 may instead determine that an action/directive generated by the skill based on NLU results contravenes a currently applicable protocol, based on metadata and/or sensor data received from vehicle 110. In such examples, the applicable protocol recognition component 295 may generate output data instead of the skill.

At action 340 the skill may generate output data. The output data may be, for example, a message explaining to the user that the requested action may not be taken at the current time. In addition, in some examples, the output data may explain a reason why the requested action may not be taken. For example, the output data may be text that states "I'm sorry. Due to safety regulations heat cannot be diverted from defrost to the cabin until the defrost has run for 10 minutes."

The output data may be passed from the skill computing device(s) 125 to speech-processing computing device(s) 120 at action 342. In various examples where the output data comprises text, the text may be sent to a TTS component of speech-processing computing device(s) 120 for generation of audio representing the text. In various other examples where the output data is to be output as text on a display, the text may be passed to the orchestrator of speech-processing computing device(s) 120. At action 344, the output data may be sent to vehicle 110 for output. If the output data has been converted to speech by the TTS component of speech-processing computing device(s) 120, the speech may be output via speakers of vehicle 110. If the output data is to be output as text, a display of vehicle 110 may display the text to alert the user why the request cannot be completed. In various examples, the skill and/or applicable protocol recognition component 295 may generate output data that may indicate that the requested action will be performed when the applicable condition preventing execution of the action (e.g., according to a safety regulation) no longer persists.

Figure 5A:
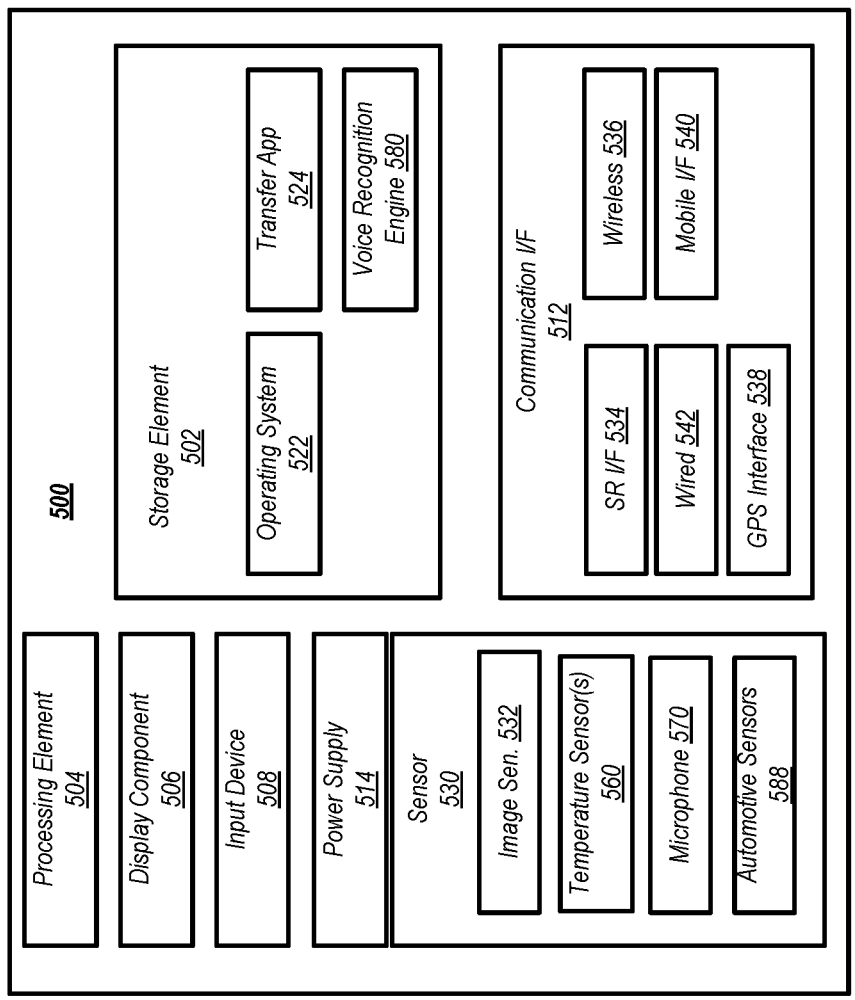
FIGS. 5A-5B are conceptual diagrams depicting computing devices that may be used in accordance with various aspects of the present disclosure.

FIG. 5A is a block diagram showing an example architecture 500 of a computing device (e.g., a computing device of vehicle 110), in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). In some examples, the processing element 504 may be effective to determine one or more protocols mapped to a set of current sensor readings. The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500. In some examples, the transfer application 524 may also be configured to send the received voice requests to one or more voice recognition servers (e.g., speech-processing computing device(s) 120).

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. Voice recognition engine 580 may interpret audio signals of sound captured by microphone 570. In some examples, voice recognition engine 580 may listen for a "wake-word" to be received by microphone 570. Upon receipt of the wake-word, voice recognition engine 480 may stream audio to a voice recognition server for analysis, such as speech-processing computing device(s) 120. In various examples, voice recognition engine 580 may stream audio to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

In some examples, the temperature sensor 560 may determine a temperature inside and/or outside of the vehicle 110. In various other examples, temperature sensor 560 may determine a temperature of the engine and/or a fuel cell of vehicle 110. Architecture 500 may also comprise one or more automotive sensors 588. The automotive sensors may include various sensors effective to determine data related to operation of vehicle 110. Some examples of the automotive sensors 588 may include oil pressure sensors, tire pressure sensors, fuel sensors, engine sensors, battery charge sensors, light sensors, LIDAR sensors, position sensors, proximity sensors, etc. In various examples, data from the various automotive sensors 588 may be used to determine the applicability of one or more protocols—such as a safety regulation that is currently applicable to the vehicle 110.

Figure 5B:
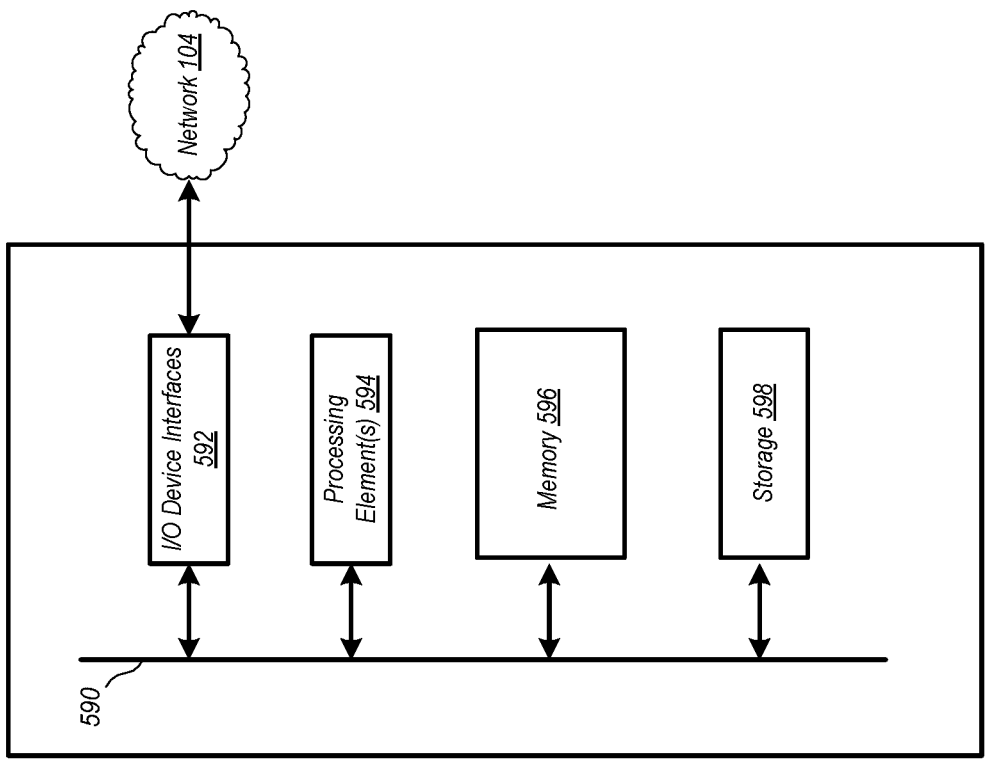

FIG. 5B is a block diagram conceptually illustrating example components of a remote device, such as the speech-processing computing device(s) 120, which may assist with ASR processing, NLU processing, applicable protocol recognition, and/or command processing. Multiple speech-processing computing device(s) 120 may be included in the system, such as one speech-processing computing device 120 for performing ASR processing, one speech-processing computing device 120 for performing NLU processing, etc. In operation, each of these devices (or groups of devices) may include computer-readable and computer-executable instructions that reside on the respective device (110/120), as will be discussed further below.

Each of these devices (110/120) may include one or more controllers/processors 594, which may each include at least one central processing unit (CPU) for processing data and computer-readable instructions, and a memory 596 for storing data and instructions of the respective device. In at least some examples, memory 596 may store, for example, a list of N-best intents data that may be generated for a particular utterance. In some examples, memory 596 may store a list of blocked intents and/or domains blocked due to a particular protocol that is currently applicable to operation of vehicle 110. The memories 596 may individually include volatile random access memory (RAM), non-volatile read only memory (ROM), non-volatile magnetoresistive memory (MRAM), and/or other types of memory. Each device (110/120) may also include a data storage component 598 for storing data and controller/processor-executable instructions. Each data storage component 598 may individually include one or more non-volatile storage types such as magnetic storage, optical storage, solid-state storage, etc. In at least some examples, storage 598 may store the N-best intents data and/or a list of blocked domains, skills, and/or intents generated for a particular utterance. Each device (110/120) may also be connected to removable or external non-volatile memory and/or storage (such as a removable memory card, memory key drive, networked storage, etc.) through respective input/output device interfaces 592. In various examples, the N-best intents data and/or a list of blocked intents, skills, and/or domains may be stored in memory 596 and/or in storage 598.

Computer instructions for operating each device (110/120) and its various components may be executed by the respective device's processing element(s) 594, using the memory 596 as temporary "working" storage at runtime. A device's computer instructions may be stored in a non-transitory manner in non-volatile memory 596 (e.g., a non-transitory computer-readable memory), storage 598, or an external device(s). Alternatively, some or all of the executable instructions may be embedded in hardware or firmware on the respective device in addition to or instead of software.

Each device (110/120) includes input/output device interfaces 592. A variety of components may be connected through the input/output device interfaces 592, as will be discussed further below. Additionally, each device (110/120) may include an address/data bus 490 for conveying data among components of the respective device. Each component within a device (110/120) may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of the vehicle 110 and the speech-processing computing device(s) 120, as described herein, are exemplary, and may be located as a stand-alone device or may be included, in whole or in part, as a component of a larger device or system.

Figure 6:
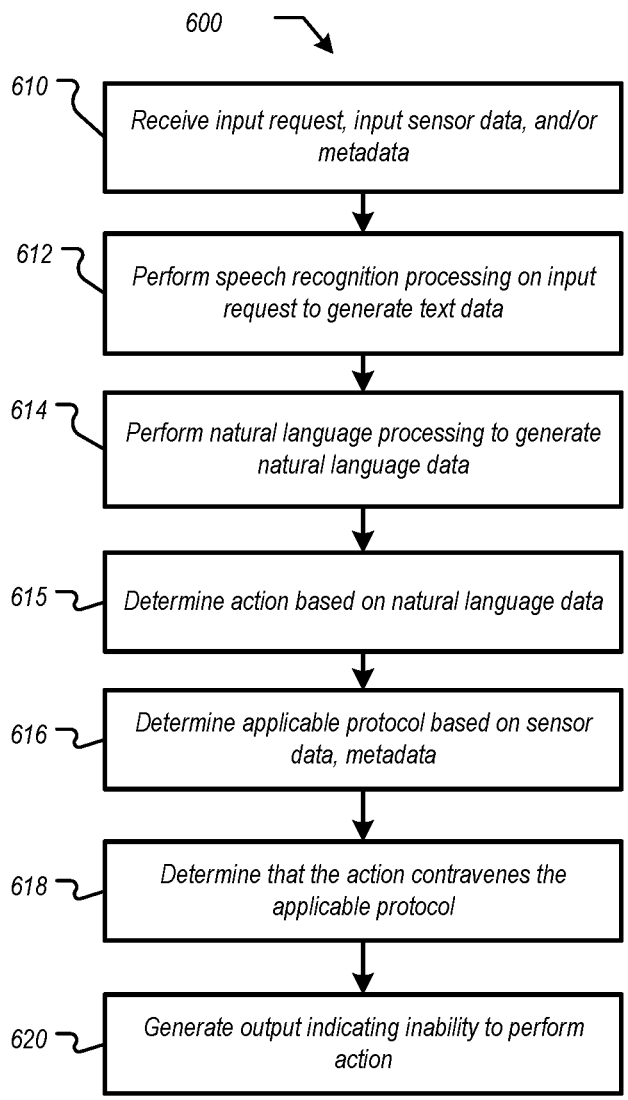
FIG. 6 depicts a flow chart showing an example process for providing user feedback in response to a prohibited action, in accordance with various aspects of the present disclosure.

FIG. 6 depicts a flow chart showing an example process 600 for providing user feedback in response to a prohibited action, in accordance with various aspects of the present disclosure. Those portions of FIG. 6 that have been previously discussed in reference to FIGS. 1-5B may not be described again for purposes of clarity and brevity. The actions of the process 600 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

In some examples, process 600 may begin at action 610, "Receive input request, input sensor data, and metadata". At action 610, one or more computing devices (e.g., computing device(s) 120 and/or computing device(s) 125) may receive an input request such as a spoken request for vehicle 110 to perform an action. In addition, at action 610, the one or more computing devices may receive input sensor data and/or metadata. The sensor data may be data measured by one or more sensors of the vehicle and describing one or more conditions related to the vehicle. The metadata may describe timing, state data, identification data, related to current processes, settings, and/or operations of the vehicle 110 (or other equipment).

Process 600 may continue from action 610 to action 612, "Perform speech recognition processing on input request to generate text data". In various examples, speech recognition (e.g., ASR) may be performed on the input request to generate a textual interpretation of the input request.

At action 614, NLU processing may be performed on the text data to generate NLU data such as a list of the N-best intents and/or a determination of one or more skills and/or domains that may represent the input request. At action 615, a skill may determine an action (e.g., a directive) based on the natural language data generated at action 614. The action may be an action that when executed by one or more systems of vehicle 110 is effective to carry out the input request received at action 610.

At action 616, the one or more computing devices may determine a protocol that is currently applicable. In various examples, the applicable protocol may be determined based on the input request, the metadata, and/or the sensor data. For example, sensor data may indicate that the trunk of the vehicle is open. The input request may be a request to drive the vehicle to a destination. The metadata may include a vehicle identifier and a timestamp. The one or more computing devices may determine (e.g., using a trained model and/or based on a mapping of safety regulations to particular conditions) that there is a safety regulation that prohibits driving while the trunk or other car door is open. Accordingly, at action 618, the one or more computing devices may determine that the action contravenes the applicable protocol. In at least some examples, the one or more computing devices may determine one or more domains, intents, and/or skills to block while the protocol is applicable. In the current example, the one or more computing devices may block the "drive" intent and/or the "drive" skill or domain to prevent driving of the car while the trunk is open. In various other examples, the one or more computing devices may filter out the action determined by the skill based on the NLU results due to the action contravening the currently-applicable protocol. For example, the applicable protocol recognition component 295 may intercept the action, determine that the action contravenes a currently applicable protocol, and may not send the action to vehicle 110 for execution due to the action contravening the applicable protocol.

Processing may continue from action 618 to action 620, "Generate output indicating inability to perform action". In various examples, the one or more computing devices may generate output explaining why the requested action cannot be carried out (e.g., based on the applicable protocol). For example, the one or more computing devices may generate text that reads "Cannot drive car. Trunk is currently unlatched. Please close trunk." The downstream filtering component and/or a skill computing in at least some examples, TTS may be used to generate audio of the output so that the audio may be played using a sound system of the vehicle to inform the user that the request cannot be satisfied and/or to advise remedial action.

Figure 7:
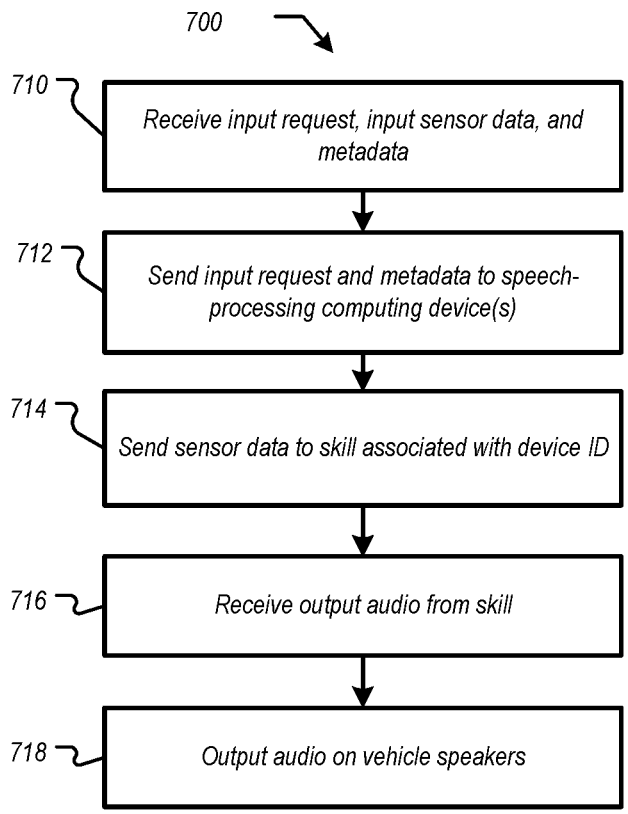
FIG. 7 depicts a flow chart showing another example process for providing user feedback in response to a prohibited action, according to embodiments of the present disclosure.

FIG. 7 depicts a flow chart showing another example process 700 for providing user feedback in response to a prohibited action, in accordance with various aspects of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

In some examples, process 700 may begin at action 710, "Receive input request, input sensor data, and metadata". At action 710, vehicle 110 may receive an input request such as a spoken request for vehicle 110 to perform an action. In addition, at action 710, the vehicle 110 may receive input sensor data and/or metadata. The sensor data may be data measured by one or more sensors of the vehicle and describing one or more conditions related to the vehicle. The metadata may describe timing, state data, identification data, related to current processes, settings, and/or operations of the vehicle 110 (or other equipment).

Process 700 may continue from action 710 to action 712, "Send input request and metadata to speech-processing computing device(s)". At action 712, vehicle 110 may send audio representing the input request and metadata to speech-processing computing device(s) 120. At action 714, vehicle may send sensor data to a skill associated with a device ID (e.g., an identifier of vehicle 110). The skill may receive intent data from the NLU. However, the NLU may not, in some cases, receive sensor data from the vehicle 110. In various examples, the skill may be associated with an original equipment manufacturer (OEM) of the vehicle 110.

At action 716, the vehicle 110 may receive output data from the skill. In at least some examples, the output may be audio data. In various examples, the skill may generate output data that explains why the requested action cannot be carried out (e.g., based on the applicable protocol). For example, the skill may generate text that reads "Cannot drive car. Trunk is currently unlatched. Please close trunk." In at least some examples, TTS may be used to generate audio of the output so that the audio may be played using a sound system of the vehicle to inform the user that the request cannot be satisfied and/or to advise remedial action. At action 718, if the output data is audio, the audio may be played back on speakers of the vehicle 110 so that the user may be informed why the requested action cannot currently be carried out. In various examples, the skill may determine an applicable protocol based at least in part on sensor data and may determine that the requested action contravenes the applicable protocol. In various other examples, a layer downstream from the skill may determine that an action of the skill contravenes a currently-applicable protocol.

Figure 8:
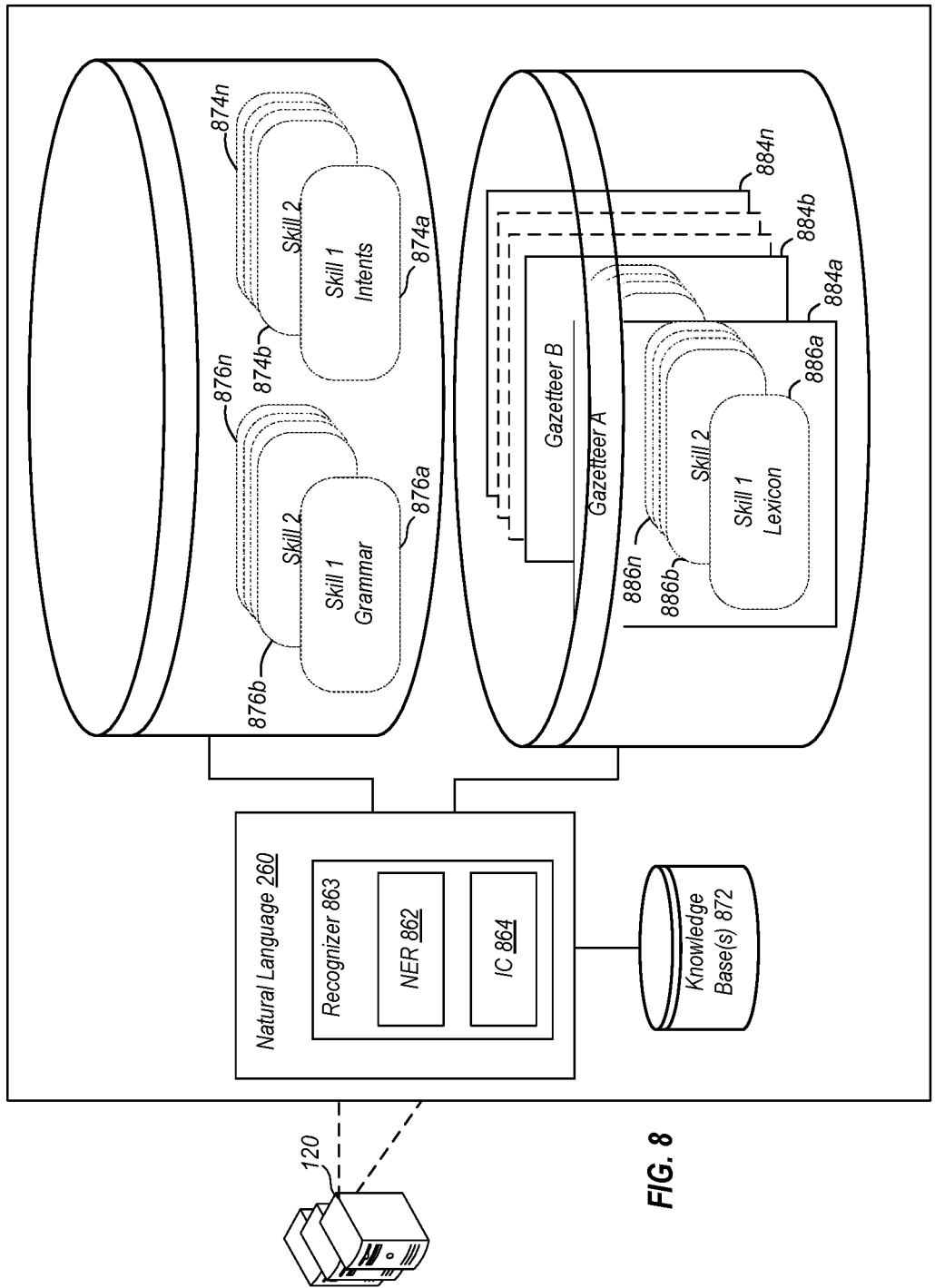
FIG. 8 is a conceptual diagram illustrating how natural language understanding processing is performed according to embodiments of the present disclosure.

FIG. 8 illustrates how NLU processing is performed on text data. Generally, the Natural language component 260 attempts to make a semantic interpretation of text data input thereto. That is, the natural language component 260 determines the meaning behind text data based on the individual words and/or phrases represented therein. The natural language component 260 interprets text data to derive an intent of the user as well as pieces of the text data that allow a device (e.g., the vehicle 110, the speech-processing computing device(s) 120, etc.) to complete that action.

The natural language component 260 may process text data including several ASR hypotheses. The natural language component 260 may process all (or a portion of) the ASR hypotheses input therein. Even though the ASR component 250 may output multiple ASR hypotheses, the natural language component 260 may be configured to only process with respect to the top scoring ASR hypothesis.

The natural language component 260 may include one or more recognizers 863. Each recognizer 863 may be associated with a different skill 290. Each recognizer 863 may process with respect to text data input to the natural language component 260. Each recognizer 863 may operate at least partially in parallel with other recognizers 863 of the natural language component 260.

Each recognizer 863 may include a named entity recognition (NER) component 862. The NER component 862 attempts to identify grammars and lexical information that may be used to construe meaning with respect to text data input therein. The NER component 862 identifies portions of text data that correspond to a named entity that may be applicable to processing performed by a skill 290. The NER component 862 (or other component of the natural language component 260) may also determine whether a word refers to an entity whose identity is not explicitly mentioned in the text data, for example "him," "her," "it" or other anaphora, exophora or the like.

Each recognizer 863, and more specifically each NER component 862, may be associated with a particular grammar model and/or database, a particular set of intents/actions (e.g., in intents database 874), and a particular personalized lexicon 886. Each gazetteer 884 may include skill-indexed lexical information associated with a particular user and/or vehicle 110. For example, a Gazetteer A (884a) includes skill-indexed lexicon 886a to 886n. A user's music skill lexical information might include album titles, artist names, and song names, for example, whereas a user's contact list skill lexical information might include the names of contacts. Since every user's music collection and contact list is presumably different, this personalized information improves entity resolution.

An NER component 862 applies grammar models 876 and lexicon 886 to determine a mention of one or more entities in text data. In this manner, the NER component 862 identifies "slots" (corresponding to one or more particular words in text data) that may be used for later processing. The NER component 862 may also label each slot with a type (e.g., noun, place, city, artist name, song name, etc.).

Each grammar model 876 includes the names of entities (i.e., nouns) commonly found in speech about the particular skill 290 to which the grammar model 876 relates, whereas the lexicon 886 is personalized to the user and/or the vehicle 110 from which the user input originated. For example, a grammar model 876 associated with a shopping skill may include a database of words commonly used when people discuss shopping.

Each recognizer 863 may also include an intent classification (IC) component 864. An IC component 864 parses text data to determine an intent(s). An intent represents an action a user desires be performed. An IC component 864 may communicate with an intents database 874 of words linked to intents. For example, a music intent database may link words and phrases such as "quiet," "volume off," and "mute" to a <Mute> intent. An IC component 864 identifies potential intents by comparing words and phrases in text data to the words and phrases in an intents database 874.

The intents identifiable by a specific IC component 864 are linked to skill-specific grammar models 876 with "slots" to be filled. Each slot of a grammar model 876 corresponds to a portion of text data that the system believes corresponds to an entity. For example, a grammar model 876 corresponding to a <PlayMusic> intent may correspond to sentence structures such as "Play {Artist Name}," "Play {Album Name}," "Play {Song name}," "Play {Song name} by {Artist Name}," etc. However, to make resolution more flexible, grammar models 876 may not be structured as sentences, but rather based on associating slots with grammatical tags.

For example, an NER component 862 may parse text data to identify words as subject, object, verb, preposition, etc. based on grammar rules and/or models prior to recognizing named entities in the text data. An IC component 864 (e.g., implemented by the same recognizer 863 as the NER component 862) may use the identified verb to identify an intent. The NER component 862 may then determine a grammar model 876 associated with the identified intent. For example, a grammar model 876 for an intent corresponding to <PlayMusic> may specify a list of slots applicable to play the identified "object" and any object modifier (e.g., a prepositional phrase), such as {Artist Name}, {Album Name}, {Song name}, etc. The NER component 862 may then search corresponding fields in a lexicon 886, attempting to match words and phrases in text data the NER component 862 previously tagged as a grammatical object or object modifier with those identified in the lexicon 886.

An NER component 862 may perform semantic tagging, which is the labeling of a word or combination of words according to their type/semantic meaning. An NER component 862 may parse text data using heuristic grammar rules, or a model may be constructed using techniques such as hidden Markov models, maximum entropy models, log linear models, conditional random fields (CRF), and the like. For example, an NER component 862 implemented by a music recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 862 identifies "Play" as a verb, which an IC component 864 may determine corresponds to a <PlayMusic> intent. At this stage, no determination has been made as to the meaning of "mother's little helper" and "the rolling stones," but based on grammar rules and models, the NER component 862 has determined the text of these phrases relates to the grammatical object (i.e., entity) of the user input represented in the text data.

The models linked to the intent are then used to determine what database fields should be searched to determine the meaning of these phrases, such as searching a user's gazetteer 884 for similarity with the model slots. For example, a model for a <PlayMusic> intent might indicate to attempt to resolve the identified object based on {Artist Name}, {Album Name}, and {Song name}, and another model for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words (e.g., in the knowledge base 872). For example, if the text data includes "play songs by the rolling stones," after failing to determine an album name or song name called "songs" by "the rolling stones," the NER component 862 may search the database for the word "songs." In the alternative, generic words may be checked before the gazetteer information, or both may be tried, potentially producing two different results.

An NER component 862 may tag text data to attribute meaning thereto. For example, an NER component 862 may tag "play mother's little helper by the rolling stones" as: {skill} Music, {intent}<PlayMusic>, {artist name} rolling stones, {media type} SONG, and {song title} mother's little helper. For further example, the NER component 862 may tag "play songs by the rolling stones" as: {skill} Music, {intent}<PlayMusic>, {artist name} rolling stones, and {media type} SONG.

Figure 9:
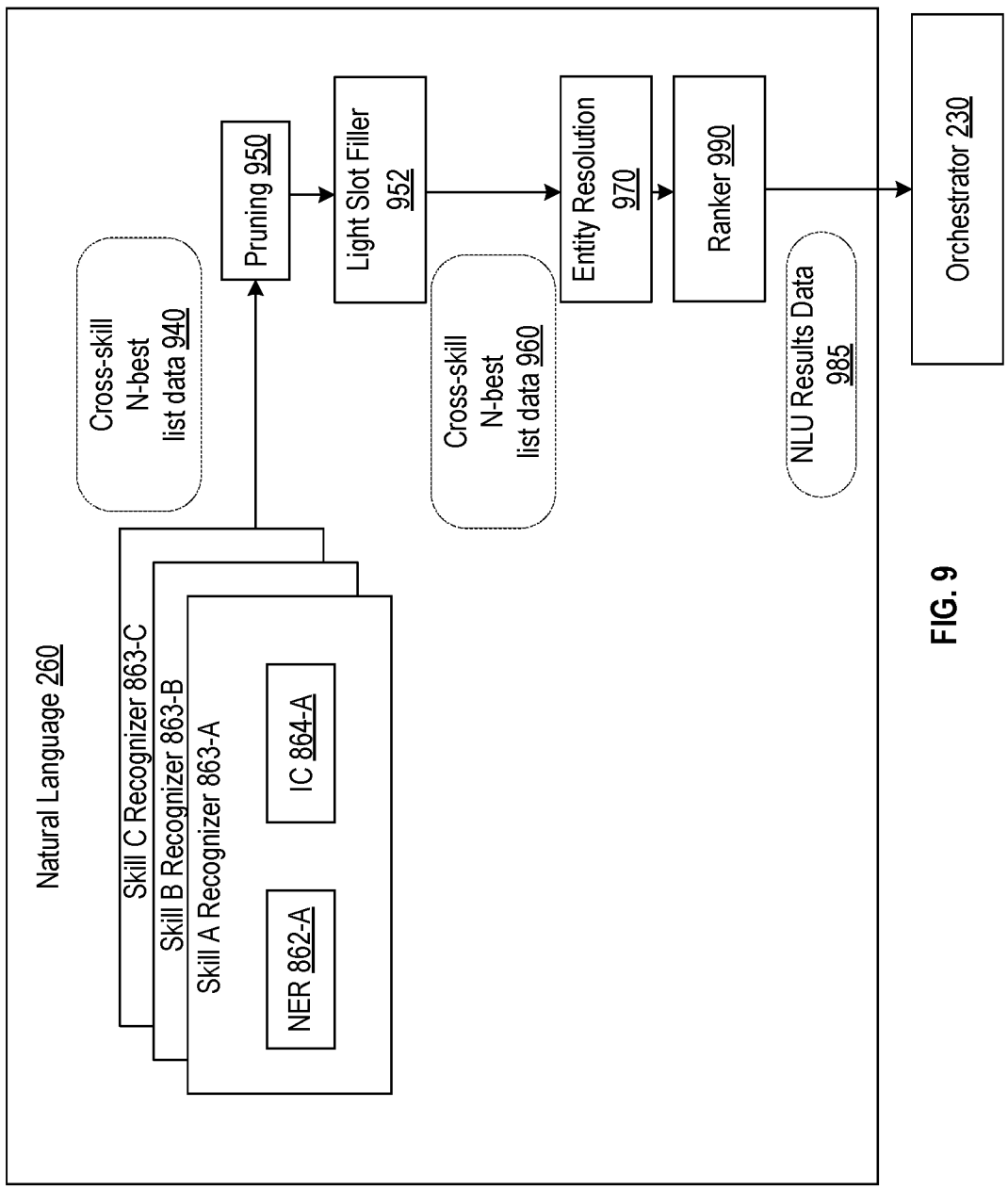
FIG. 9 is a conceptual diagram illustrating how natural language understanding processing is performed according to embodiments of the present disclosure.

The natural language component 260 may generate cross-skill N-best list data 940, which may include a list of NLU hypotheses output by each recognizer 863 (as illustrated in FIG. 9). A recognizer 863 may output tagged text data generated by an NER component 862 and an IC component 864 operated by the recognizer 863, as described above. Each NLU hypothesis including an intent indicator and text/slots may be grouped as an NLU hypothesis represented in the cross-skill N-best list data 940. Each NLU hypothesis may also be associated with one or more respective score(s) for the NLU hypothesis. For example, the cross-skill N-best list data 940 may be represented as, with each line representing a separate NLU hypothesis:

[0.95] Intent: <PlayMusic> ArtistName: Lady Gaga SongName: Poker Face
[0.95] Intent: <PlayVideo> ArtistName: Lady Gaga VideoName: Poker Face
[0.01] Intent: <PlayMusic> ArtistName: Lady Gaga AlbumName: Poker Face
[0.01] Intent: <PlayMusic> SongName: Pokerface As previously described, in various examples, intents that are proscribed by a currently applicable protocol (e.g., a safety regulation) may be blocked at the NLU level, domain level, and/or at the skill level.

In various examples, the cross-skill N-best list data 940 and/or 960 may comprise the N-best Intents data—e.g., a list of N intents with the highest confidence scores among intents scored for a particular utterance). The natural language component 260 may send the cross-skill N-best list data 940 to a pruning component 950. The pruning component 950 may sort the NLU hypotheses represented in the cross-skill N-best list data 940 according to their respective scores. The pruning component 950 may then perform score thresholding with respect to the cross-skill N-best list data 940. For example, the pruning component 950 may select NLU hypotheses represented in the cross-skill N-best list data 940 associated with confidence scores satisfying (e.g., meeting and/or exceeding) a threshold confidence score. The pruning component 950 may also or alternatively perform number of NLU hypothesis thresholding. For example, the pruning component 950 may select a maximum threshold number of top scoring NLU hypotheses. The pruning component 950 may generate cross-skill N-best list data 960 including the selected NLU hypotheses. The purpose of the pruning component 950 is to create a reduced list of NLU hypotheses so that downstream, more resource intensive, processes may only operate on the NLU hypotheses that most likely represent the user's intent. In various examples, applicable protocol recognition component 295 may send data to pruning component and/or to another component of the Natural language component 260 through orchestrator 230 to block one or more intents, domains, and/or skills due to sensor data 213 and/or metadata 215 when applicable protocol recognition component 295 determines that a current request would violate the applicable protocol.

The natural language component 260 may also include a light slot filler component 952. The light slot filler component 952 can take text data from slots represented in the NLU hypotheses output by the pruning component 950 and alter it to make the text data more easily processed by downstream components. The light slot filler component 952 may perform low latency operations that do not involve heavy operations, such as those requiring reference to a knowledge base. The purpose of the light slot filler component 952 is to replace words with other words or values that may be more easily understood by downstream system components. For example, if an NLU hypothesis includes the word "tomorrow," the light slot filler component 952 may replace the word "tomorrow" with an actual date for purposes of downstream processing. Similarly, the light slot filler component 952 may replace the word "CD" with "album" or the words "compact disc." The replaced words are then included in the cross-skill N-best list data 960.

The natural language component 260 sends the cross-skill N-best list data 960 to an entity resolution component 970. The entity resolution component 970 can apply rules or other instructions to standardize labels or tokens from previous stages into an intent/slot representation. The precise transformation may depend on the skill 290. For example, for a travel skill, the entity resolution component 970 may transform text data corresponding to "Seattle airport" to the standard SEA three-letter code referring to the airport. The entity resolution component 970 can refer to a knowledge base that is used to specifically identify the precise entity referred to in each slot of each NLU hypothesis represented in the cross-skill N-best list data 960. Specific intent/slot combinations may also be tied to a particular source, which may then be used to resolve the text data. In the example "play songs by the stones," the entity resolution component 970 may reference a personal music catalog, Amazon Music account, user profile data, or the like. The entity resolution component 970 may output text data including an altered N-best list that is based on the cross-skill N-best list data 960, and that includes more detailed information (e.g., entity IDs) about the specific entities mentioned in the slots and/or more detailed slot data that can eventually be used by downstream components to perform an action responsive to the user input. The natural language component 260 may include multiple entity resolution components 970 and each entity resolution component 970 may be specific to one or more skills 290.

The entity resolution component 970 may not be successful in resolving every entity and filling every slot represented in the cross-skill N-best list data 960. This may result in the entity resolution component 970 outputting incomplete results.

The natural language component 260 may include a ranker component 990. The ranker component 990 may assign a particular confidence score to each NLU hypothesis input therein. The confidence score of an NLU hypothesis may represent a confidence of the system in the NLU processing performed with respect to the NLU hypothesis. The confidence score of a particular NLU hypothesis may be affected by whether the NLU hypothesis has unfilled slots. For example, if an NLU hypothesis associated with a first skill includes slots that are all filled/resolved, that NLU hypothesis may be assigned a higher confidence score than another NLU hypothesis including at least some slots that are unfilled/unresolved by the entity resolution component 970.

The ranker component 990 may apply re-scoring, biasing, and/or other techniques to determine the top scoring NLU hypotheses. To do so, the ranker component 990 may consider not only the data output by the entity resolution component 970, but may also consider other data such as skill 290 rating or popularity data. For example, if one skill 290 has a particularly high rating, the ranker component 990 may increase the score of an NLU hypothesis associated with that skill 290, and vice versa. The other data may include information about skills 290 that have been enabled for the user identifier and/or device identifier associated with the current user input. For example, the ranker component 990 may assign higher scores to NLU hypotheses associated with enabled skills 290 than NLU hypotheses associated with non-enabled skills 290. The other data may include data indicating user usage history, such as if the user identifier associated with the current user input is regularly associated with user inputs that invoke a particular skill 290 or does so at particular times of day. The other data may include data indicating date, time, location, weather, type of vehicle 110, user identifier, device identifier, context, as well as other information. For example, the ranker component 990 may consider when any particular skill 290 is currently active (e.g., music being played, a game being played, etc.) with respect to the user or vehicle 110 associated with the current user input. The other data may include device type information. For example, if the vehicle 110 does not include a display, the ranker component 990 may decrease the score associated with an NLU hypothesis that would result in displayable content being presented to a user, and vice versa.

Following ranking by the ranker component 990, the natural language component 260 may output NLU results data 985 to the orchestrator component 230. The NLU results data 985 may include a ranked list of the top scoring NLU hypotheses as determined by the ranker component 990. Alternatively, the NLU results data 985 may include the top scoring NLU hypothesis as determined by the ranker component 990.

The orchestrator component 230 may select a skill 290, based on the NLU results data 885, for performing an action responsive to the user input. In an example, the orchestrator component 230 may send all (or a portion of) the NLU results data 985 to a skill 290 that is represented in the NLU results data 985 and to be invoked to perform an action responsive to the user input.

Among other potential benefits, a system in accordance with the present disclosure may improve the user experience by explaining to a user issuing a voice request that the request cannot be completed at the current time due to applicable protocols, such as safety regulations. Currently, when a user makes a voice request that contravenes an applicable protocol, a vehicle or other system may not take the requested action (due to the protocol), but may not explain to the user the reason that the vehicle is not completing the request. This may lead to user frustration as the user may be unaware of the applicable protocol and may be frustrated with the lack of compliance with the spoken request. Accordingly, various speech-processing techniques described herein may be used to determine the applicable protocol and to provide an explanation to the users why the requested action cannot yet be completed. In addition, the speech-processing systems described herein may be effective to explain to the user that the requested action can be completed after the conditions related to the protocol are satisfied.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of responding to spoken requests, the method comprising:
   receiving, at a speech processing system from a computing device associated with an automobile, input audio data corresponding to a spoken request to perform a function by a mechanical component of the automobile;
   receiving first metadata associated with the automobile;
   determining, by the speech processing system, intent data representing a semantic interpretation of the input audio data, the intent data comprising an intent associated with the function;
   determining based at least on the first metadata a first skill associated with the computing device;
   sending the intent data to the first skill;
   determining, by the first skill, an action corresponding to the intent data, the action effective to cause the computing device to initiate the function by the mechanical component;
   receiving, from an automobile sensor, first sensor data indicating a first environmental condition associated with the automobile;
   determining, by the first skill, that a safety regulation restricts performance of the function by the mechanical component when a first value of the first environmental condition is outside a range of permissible values associated with the safety regulation;
   determining, during a first time period, that the first sensor data includes a second value of the first environmental condition and that the second value is outside the range of permissible values;
   generating output data indicating that the performance of the function in accordance with the action violates the safety regulation;
   generating, by a text-to-speech (TTS) component of the speech processing system, audio data representing the output data; and
   sending, by the speech processing system, the audio data to the computing device.

2. The method of claim 1, further comprising:
   receiving, from the automobile sensor, second sensor data indicating a second environmental condition associated with the automobile during a second time period following the first time period;
   determining that a third value of the second environmental condition is within the range of permissible values stored in a data structure in association with the safety regulation;
   generating second output data indicating that the safety regulation is no longer applicable; and
   sending, by the first skill, the action to the computing device associated with the automobile.

3. A method comprising:
   receiving, from a first computing system, a first request;
   determining natural language data comprising a semantic representation of the first request;
   receiving first metadata corresponding to the first computing system;
   determining based at least on the first metadata a first skill associated with the first computing system;
   sending the natural language data to the first skill;
   determining, based at least in part on the natural language data, a first action for responding to the first request;
   determining a restriction on execution of the first action in accordance with the first metadata, wherein the first skill determines the first action and the restriction on execution; and
   sending output data to the first computing system, the output data being indicative of the restriction on execution of the first action.

4. The method of claim 3, further comprising:
   receiving sensor data generated by a sensor of the first computing system;
   determining a first protocol based at least in part on the sensor data;
   determining that the sensor data corresponds to a condition of the first protocol; and
   determining the restriction on execution of the first action based at least in part on the sensor data corresponding to the condition of the first protocol.

5. The method of claim 3, further comprising:
   receiving, from the first skill, output text indicating that the first action is currently unable to be executed due to a first protocol; and generating, by a text-to-speech component, audio data corresponding to the output text, wherein the output data comprises the audio data.

6. The method of claim 3, wherein the first request is a spoken request, the method further comprising:
determining, by a speech recognition component, text representing the first request; and
determining the natural language data based at least in part on the text representing the first request.

7. The method of claim 3, further comprising:
receiving, from the first computing system, first sensor data from a vehicle sensor;
determining a first protocol based at least in part on the first sensor data from the vehicle sensor, wherein the first protocol is associated with the restriction on execution of the first action; and
determining the restriction on execution of the first action based at least in part on the first sensor data.

8. The method of claim 3, wherein the first computing system comprises a vehicle system, the method further comprising:
receiving second metadata corresponding to the first computing system;
determining that the restriction is no longer applicable based at least in part on the second metadata;
generating an executable command corresponding to the first action; and
sending the executable command to the first computing system.

9. The method of claim 3, wherein the first metadata is received during a first time period, the method further comprising:
storing the first action in non-transitory, computer-readable memory;
receiving, during a second time period after the first time period, second metadata corresponding to the first computing system;
determining that the restriction is no longer applicable based at least in part on the second metadata;
retrieving, from the non-transitory, computer-readable memory, the first action; and
sending the first action to the first computing system, wherein the first action comprises executable instructions effective to cause the first computing system to perform an action corresponding to the first request.

10. A computing system, comprising:
at least one processor; and
non-transitory, computer-readable memory storing instructions that, when executed by the at least one processor, are effective to:
receive, from a first system, a first request;
determine natural language data comprising a semantic representation of the first request;
receive first metadata corresponding to the first system;
determine, based at least on the first metadata a first skill associated with the first system;
send the natural language data to the first skill;
determine, based at least in part on the natural language data, a first action for responding to the first request;
determine a restriction on execution of the first action in accordance with the first metadata, wherein the first skill determines the first action and the restriction on execution; and
send output data to the first system, the output data being indicative of the restriction on execution of the first action.

11. The computing system of claim 10, wherein the instructions, when executed by the at least one processor, are effective to:
receiving sensor data generated by a sensor of the first system;
determine a first protocol based at least in part on the sensor data;
determine that the sensor data corresponds to a condition of the first protocol; and
determine the restriction on execution of the first action based at least in part on the sensor data corresponding to the condition of the first protocol.

12. The computing system of claim 10, wherein the instructions, when executed by the at least one processor, are effective to:
receive, from the first skill, output text indicating that the first action is currently unable to be executed due to a first protocol; and
generate, by a text-to-speech component, audio data corresponding to the output text, wherein the output data comprises the audio data.

13. The computing system of claim 10, wherein the instructions, when executed by the at least one processor, are effective to:
determine, by a speech recognition component, text representing the first request; and
determine the natural language data based at least in part on the text representing the first request.

14. The computing system of claim 10, wherein the instructions, when executed by the at least one processor, are effective to:
receive, from the first system, first sensor data from a vehicle sensor;
determine a first protocol based at least in part on the first sensor data from the vehicle sensor, wherein the first protocol is associated with the restriction on execution of the first action; and
determine the restriction on execution of the first action based at least in part on the first sensor data.

15. The computing system of claim 10, wherein the first system comprises a vehicle system, and wherein the instructions, when executed by the at least one processor, are effective to:
receive second metadata corresponding to the first system;
determine that the restriction is no longer applicable based at least in part on the second metadata;
generate an executable command corresponding to the first action; and
send the executable command to the first system.

16. The computing system of claim 10, wherein the first system comprises a vehicle system, the first metadata is received during a first time period, and wherein the instructions, when executed by the at least one processor, are effective to:
store the first action in the non-transitory computer-readable memory;
receive, during a second time period after the first time period, second metadata corresponding to the first system;
determine that the restriction is no longer applicable based at least in part on the second metadata;
retrieve, from the non-transitory computer-readable memory, the first action; and
send the first action to the first system, wherein the first action comprises executable instructions effective to cause the first system to perform an action corresponding to the first request.

17. The computing system of claim 10, wherein the first system comprises a vehicle system, and wherein the instructions, when executed by the at least one processor, are effective to:
  receive, at the computing system from a computing device associated with a vehicle, the first metadata, the first metadata comprising a vehicle identifier;
  determine, by the computing system, a skill associated with a manufacturer of the vehicle using the vehicle identifier; and
  generate, by the skill, output text corresponding to a first safety regulation, wherein the output data comprises the output text.

18. A method comprising:
  receiving, from a first computing system, a first request;
  determining intent data representing a semantic interpretation of the first request;
  receiving first metadata corresponding to the first computing system;
  receiving sensor data generated by a sensor of the first computing system;
  determining a first protocol based at least in part on the sensor data;
  determining that the sensor data corresponds to a condition of the first protocol;
  determining a restriction on the sending of the intent data to a first application based at least in part on the first metadata and based at least in part on the sensor data corresponding to the condition of the first protocol; and
  sending output data to the first computing system, the output data being indicative of the restriction on the sending of the intent data to the first application.

19. The method of claim 18, further comprising:
  receiving, from the first computing system, first sensor data from a vehicle sensor;
  determining a first protocol based at least in part on the first sensor data from the vehicle sensor, wherein the first protocol is associated with the restriction on execution of the sending of the intent data; and
  determining the restriction on the sending of the intent data to the first application based at least in part on the first sensor data.

\* \* \* \* \*